United States Patent
O'Hare et al.

(10) Patent No.: US 10,065,172 B2
(45) Date of Patent: Sep. 4, 2018

(54) MODIFICATION OF LAYERED DOUBLE HYDROXIDES

(71) Applicant: SCG Chemicals Co., Ltd., Bangkok Metropolis (TH)

(72) Inventors: Dermot O'Hare, Oxford (GB); Qiang Wang, Oxford (GB)

(73) Assignee: SCG CHEMICALS CO., LTD., Bangkok Metropolis (TH)

(*) Notice: Subject to any disclaimer, the term of this patent is extended or adjusted under 35 U.S.C. 154(b) by 250 days.

(21) Appl. No.: 14/432,019

(22) PCT Filed: Sep. 27, 2013

(86) PCT No.: PCT/TH2013/000052
§ 371 (c)(1),
(2) Date: Mar. 27, 2015

(87) PCT Pub. No.: WO2014/051530
PCT Pub. Date: Apr. 3, 2014

(65) Prior Publication Data
US 2015/0238927 A1 Aug. 27, 2015

(30) Foreign Application Priority Data
Sep. 28, 2012 (GB) .................................. 1217348.0

(51) Int. Cl.
*B01J 20/08* (2006.01)
*C01F 7/00* (2006.01)
(Continued)

(52) U.S. Cl.
CPC ......... *B01J 20/08* (2013.01); *B01J 20/28069* (2013.01); *B01J 20/3078* (2013.01);
(Continued)

(58) Field of Classification Search
CPC .... B01J 20/3085; B01J 20/08; B01J 20/3078; B01J 20/3071; B01J 21/10; B01J 21/02;
(Continued)

(56) References Cited

U.S. PATENT DOCUMENTS 6,387,033 B1 * 5/2002 Choudary .............. B01J 23/466
423/594.1
6,852,670 B1 * 2/2005 Ogawa .................. A61K 9/143
252/184
(Continued)

FOREIGN PATENT DOCUMENTS

| CN | 101084066 A | 12/2007 |
|----|-------------|---------|
| CN | 103159238 A | 6/2013 |

(Continued)

OTHER PUBLICATIONS

Khan, et al., "Recent developments . . . Anions", Ind. Eng. Chem. Res. 2009, 48, pp. 10196-10205.*
(Continued)

*Primary Examiner* — Steven J Bos
(74) *Attorney, Agent, or Firm* — Dorsey & Whitney LLP

(57) ABSTRACT

The present invention relates to a process for modifying a layered double hydroxide (LDH), the process comprising,
a. providing a water-wet layered double hydroxide of formula:

$$[M^{z+}_{1-x}M'^{y+}_{x}(OH)_2]^{a+}(X^{n-})_{a/r} \cdot bH_2O \quad (1)$$

wherein M and M' are metal cations, z=1 or 2; y=3 or 4, x is 0.1 to 1, preferably x<1, more preferably x=0.1-0.9, b is 0 to 10, X is an anion, r is 1 to 3, n is the charge on the anion X and a is determined by x, y and z, preferably a=z(1−x)+xy−2;
b. maintaining the layered double hydroxide water-wet, and
(Continued)

c. contacting the water-wet layered double hydroxide with at least one solvent, the solvent being miscible with water and preferably having a solvent polarity (P') in the range 3.8 to 9, as well as to a layered double hydroxide prepared according to that process.

16 Claims, 17 Drawing Sheets

(51) Int. Cl.
| | |
|---|---|
| B01J 20/30 | (2006.01) |
| B01J 21/10 | (2006.01) |
| B01J 23/06 | (2006.01) |
| B01J 27/053 | (2006.01) |
| B01J 27/138 | (2006.01) |
| B01J 27/232 | (2006.01) |
| B01J 27/25 | (2006.01) |
| B01J 37/04 | (2006.01) |
| B01J 37/08 | (2006.01) |
| B01J 20/28 | (2006.01) |

(52) U.S. Cl.
CPC .............. *B01J 21/10* (2013.01); *B01J 23/06* (2013.01); *B01J 27/053* (2013.01); *B01J 27/138* (2013.01); *B01J 27/232* (2013.01); *B01J 27/25* (2013.01); *B01J 37/04* (2013.01); *B01J 37/08* (2013.01); *C01F 7/005* (2013.01); *C01P 2002/22* (2013.01); *C01P 2002/72* (2013.01); *C01P 2002/82* (2013.01); *C01P 2002/88* (2013.01); *C01P 2004/03* (2013.01); *C01P 2004/04* (2013.01); *C01P 2006/10* (2013.01); *C01P 2006/12* (2013.01); *C01P 2006/14* (2013.01); *C01P 2006/21* (2013.01)

(58) Field of Classification Search
CPC ... B01J 23/02; B01J 23/06; B01J 23/08; B01J 23/745; B01J 27/25; B01J 27/138; B01J 27/053; B01J 27/232; B01J 37/04; B01J 37/08; B01J 37/06; C01F 7/005
USPC .......................... 502/406, 414, 439; 252/184
See application file for complete search history.

(56) References Cited

U.S. PATENT DOCUMENTS

| | | | |
|---|---|---|---|
| 9,382,123 B2 * | 7/2016 | O'Hare | C01F 7/005 |
| 2009/0267024 A1 | 10/2009 | Ono et al. | |
| 2017/0107116 A1 | 4/2017 | O'Hare et al. | |

FOREIGN PATENT DOCUMENTS

| | | |
|---|---|---|
| EP | 794152 A2 | 9/1997 |
| JP | 06191854 A | 7/1994 |
| JP | 2005060164 A | 3/2005 |
| WO | WO2007065877 A1 | 6/2007 |
| WO | WO2011124931 A1 | 10/2011 |
| WO | 2014051530 A2 | 4/2014 |
| WO | 2015144778 A1 | 10/2015 |

OTHER PUBLICATIONS

The International Search Report in related International Application No. PCT/TH2013/000052 filed Sep. 27, 2013, 5 pages.

Meyn, Martina et al. "Anion-Exchange Reactions of Layered Double Hydroxides." American Chemical Society. Inorganic Chemistry, vol. 29, 1990, pp. 5201-5207.

Li, B. et al. "Preparation of poly (methyl methacrylate)/LDH nanocomposite by exfoliation-adsorption process." Department of Chemistry, University of Science and Technology China, Colloid Polym Sci, vol. 81, 2003, pp. 998-1001.

Williams, Gareth R. et al. "Staging during anion-exchange intercalation into [LIAl2(OH)6]ClyH20: structural and mechanistic insights." The Royal Society of Chemistry, Dalton Trans. 2007, pp. 3499-3506.

Song, Yanchao et al. "Self-assembled hierarchical porous layered double hydroxides by solvothermal method and their application for capacitors." Institute of Advanced Marine Materials, Harbin Engineering University, China. Microporous and Mesoporous Materials, vol. 148, 2012, pp. 159-165.

Chen et al., "Synthesis and Characterisation of Aqueous Miscible Organic-Layered Double Hydroxides," Journals of Materials Chemistry A, Aug. 7, 2014, pp. 15102-15110, vol. 2.

Chen et al., "Tuneable Ultra High Specific Surface Area Mg/Al—CO3 Layered Double Hydroxides," Dalton Transactions, Aug. 26, 2015, pp. 16392-16398, vol. 44.

Yang et al., "Synthesis and Characterisation of Layered Double Hydroxide Dispersions in Organic Solvents," RSC Advances, Oct. 6, 2014, pp. 51676-51682, vol. 4.

International Search Report for International Application No PCT/EP2015/056444, dated Aug. 14, 2015 (4 pages).

Behera et al., "Low Temperature Synthesis of Spherical Lanthanum Aluminate Nanoparticles," Mater Lee, 2004, pp. 3710-3715, vol. 58, No. 29.

Carja et al., "The Role of the Organic Solvent in Obtaining Hydrotalcite—Like Anionic Clay Nanopowders with Specific Textural and Porous Properties," COFrRoCA, 2006, pp. 157-162.

Lohe et al., "Heating and Separation using Nanomagnet-functionalized Metal-Organic Frameworks," Chem. Commun., 2011, pp. 3075-3077, vol. 47.

Wang et al., "Electronic Supporting Information: Large-Scale Synthesis of Highly Dispersed Layered Double Hydroxide Powders Containing Delaminated Single Layer Nanosheets," 2013, pp. 1-18.

Wang et al., "Large-Scale Synthesis of Highly Dispersed Layered Double Hydroxide Powders Containing Delaminated Single Layer Nanosheets," Chemical Communications, Jun. 5, 2013, pp. 6301, vol. 49, No. 56.

Written Opinion of the International Searching Authority for International Patent Application No. PCT/TH2013/000052, dated Apr. 4, 2014 (4 pages).

\* cited by examiner

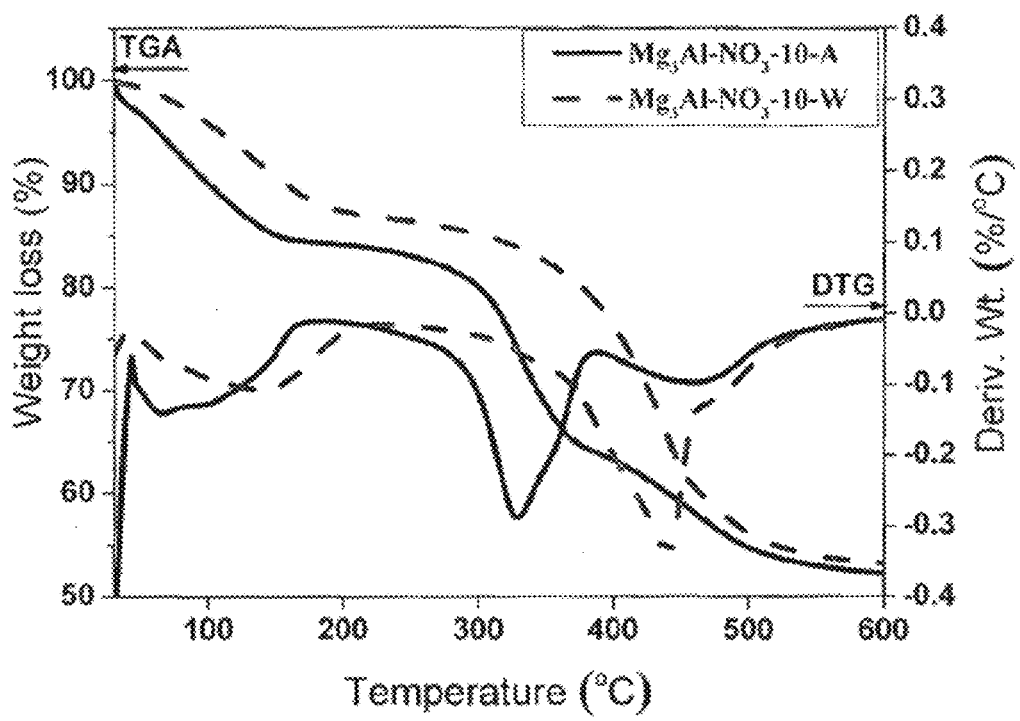
Figure 26(a)
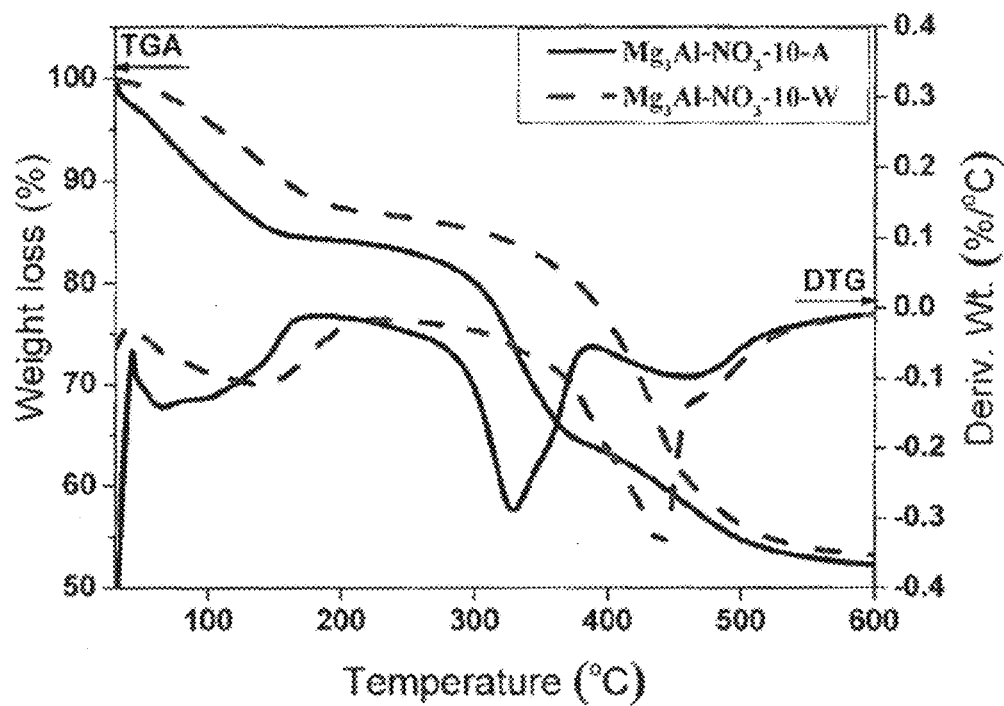
Figure 26(b)
Figure 26

MODIFICATION OF LAYERED DOUBLE HYDROXIDES

FIELD OF THE INVENTION

The present invention relates to a process for modifying layered double hydroxides (LDHs) and the modified layered double hydroxides prepared thereby.

SUMMARY

Layered double hydroxides (LDHs) are a class of compounds which comprise two metal cations and have a layered structure. A review of LDHs is provided in *Structure and Bonding*; Vol 119, 2005 *Layered Double Hydroxides* ed. X Duan and D. G. Evans. The hydrotalcites, perhaps the most well-known examples of LDHs, have been studied for many years. LDHs can intercalate anions between the layers of the structure. WO 99/24139 discloses use of LDHs to separate anions including aromatic and aliphatic anions.

Owing to the relatively high surface charge and hydrophilic properties of LDHs, the particles or crystallites of conventionally synthesised LDHs are generally highly aggregated. The result of this is that, when produced, LDHs aggregate to form "stone-like", non-porous bodies with large particle sizes of up to several hundred microns and low specific surface area of generally 5 to 15 m$^2$/g (as disclosed for example in Wang et al *Catal. Today* 2011, 164, 198). Reports by e.g. Adachi-Pagano et al (*Chem Commun.* 2000, 91) of relatively high surface area LDHs have specific surface areas no higher than 5 to 120 m$^2$/g.

In certain applications (for example adsorbents or catalyst supports) it would be advantageous to provide LDHs with higher surface areas than currently known. Relatively high surface areas would lead to a greater number of active sites and facilitate mass transport from the surface to bulk.

It is an object of the present invention to provide a process for modifying layered double hydroxides and to provide layered double hydroxides overcoming the disadvantages of the prior art. Especially LDHs shall be provided having reduced aggregation of LDH crystallines/particles, having high surface area, large pore volume and/or low particle density and/or apparent or tap density.

BRIEF DESCRIPTION OF THE DRAWINGS

FIG. 26. TGA and DTG analysis of Mg$_3$Al—NO$_3$-10 LDHs (a) in the range of 30-600° C. and (b) in the range of 30-230° C. Mg$_3$Al—NO$_3$-10-W was prepared by a conventional coprecipitation method in water at pH 10, while Mg$_3$Al—NO$_3$-10-A was prepared under identical conditions in water at pH 10 according to the method of the present invention using acetone as the solvent.

DETAILED DESCRIPTION

Figure 1:
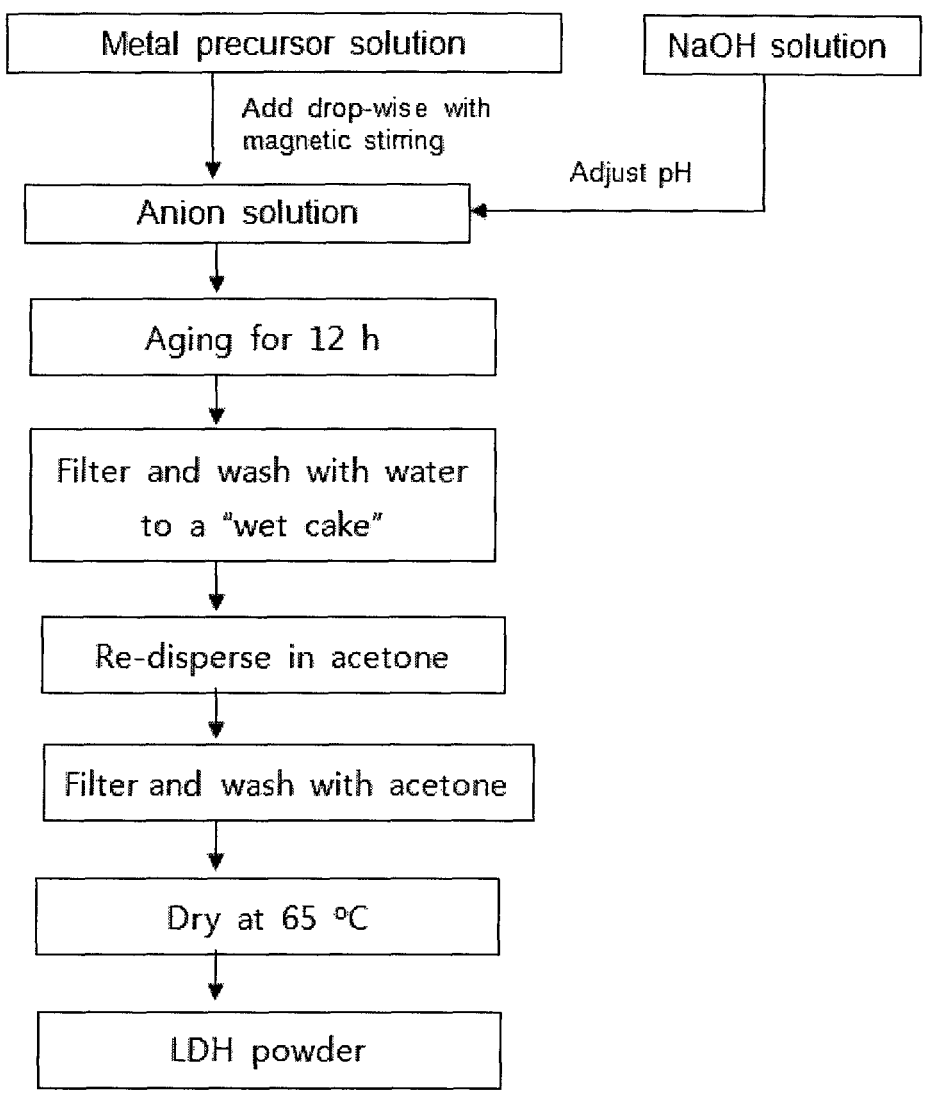
FIG. 1. The LDH synthesis procedure including the inventive acetone treatment.

The present invention accordingly provides, in a first aspect, a process for modifying a layered double hydroxide (LDH), the process comprising, a. providing a water-wet layered double hydroxide of formula:

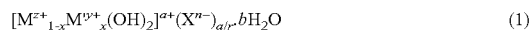
$$[M^{z+}_{1-x}M'^{y+}_x(OH)_2]^{a+}(X^{n-})_{a/r} \cdot bH_2O \qquad (1)$$

wherein M and M' are metal cations, z=1 or 2; y=3 or 4, x is 0.1 to 1, preferably x<1, more preferably x=0.1-0.9, b is 0 to 10, X is an anion, r is 1 to 3, n is the charge on the anion X and a is determined by x, y and z, preferably a=z(1−x)+xy−2;

b. maintaining the layered double hydroxide as water-wet, and c. contacting the water-wet layered double hydroxide with at least one solvent, the solvent being miscible with water and preferably having a solvent polarity (P') in the range 3.8 to 9.

This process is greatly advantageous because despite being such a simple process it, surprisingly, results in highly porous and highly dispersed LDHs, preferably having low particle density. For instance, for a conventionally synthesized $Zn_2Al$-borate LDH, its specific surface area ($N_2$) and total pore volume are only 13.4 $m^2/g$ and 0.08 cc/g, respectively. However, the inventors have discovered that LDH modified according to the invention has a specific surface area and total pore volume increased to 301 $m^2/g$ and 2.15 cc/g, respectively. In addition, the modified LDH has a very uniform particle size of about 5 μm. This method of the invention can be applied to all LDHs. In addition this method is simple and can be easily scaled up for commercial production.

Solvent polarity (P') is defined based on experimental solubility data reported by Snyder and Kirkland (Snyder, L. R.; Kirkland, J. J. In *Introduction to modern liquid chromatography,* 2nd ed.; John Wiley and Sons: New York, 1979; pp 248-250,) and as described in the table in the Examples section, below.

Preferably, aggregation of particles/crystallites of the LDH is reduced. Also preferred, in step a., as stated above, a substance comprising a water-wet layered double hydroxide of formula (1) may be provided.

In a most preferred embodiment, the at least one solvent is not water.

The water-wet LDH should not dry before contacting the solvent and is preferably a water slurry of LDH particles. The preferred method of contacting the water-wet LDH with the solvent is dispersing the water-wet LDH in the solvent.

M may be a single metal cation or a mixture of different metal cations for example Mg, Zn, Fe for a MgFeZn/Al LDH. Preferred M are Mg, Zn, Fe, Ca or a mixture of two or more of these.

M' may be a single metal cation or a mixture of different metal cations, for example Al, Ga, Fe. The preferred M' is Al. The preferred value of y is 3.

Preferably, z is 2 and M is Ca or Mg or Zn or Fe.

Preferably, M is Zn, Mg or Ca, and M' is Al.

Preferred values of x are 0.2 to 0.5, preferably 0.22 to 0.4, more preferably 0.23 to 0.35.

Overall, as is clear for a skilled artisan, the LDH according to formula (1) must be neutral, so that the value of a is determined by the number of positive charges and the charge of the anion.

The anion in the LDH may be any appropriate anion, organic or inorganic, for example halide (e.g. chloride), inorganic oxyanions (e.g. $X_mO_n(OH)_p^{q-}$; m=1-5; n=2-10; p=0-4, q=1-5; X=B, C, N, S, P: e.g. carbonate, bicarbonate, hydrogenphosphate, dihydrogenphosphate, nitrite, borate, nitrate, phosphate, sulphate), anionic surfactants (such as sodium dodecyl sulfate, fatty acid salts or sodium stearate), anionic chromophores, and/or an anionic UV absorbers for example 4-hydroxy-3-10 methoxybenzoic acid, 2-hydroxy-4 methoxybenzophenone-5-sulfonic acid (HMBA), 4-hydroxy-3-methoxy-cinnamic acid, p aminobenzoicacid and/or urocanic acid.

Preferably, the particles of the LDH have a size in the range 1 nm to 200 microns, more preferably 2 nm to 30 microns and preferably 2 nm-20 micron, most preferably 2 nm to 10 microns.

Preferably, the aspect ratio of the LDH particles will be in the range 30 nm to 1500 nm (determined as platelet area/platelet thickness) preferably 80 to 500 nm and more preferably 100 nm to 350 nm.

Generally, any suitable organic solvent, preferably anhydrous, may be used but the preferred solvent is selected from one or more of acetone, acetonitrile, dimethylformamide, dimethyl sulfoxide, dioxane, ethanol, methanol, n-propanol, iso-propanol, 2-propanol or tetrahydrofuran. The preferred solvent is acetone. Other preferred solvents are alkanols e.g. methanol or ethanol.

The role of the organic solvent is to strip the surface bound water from the water wet LDH particles. The dryer the solvent, the more water can be removed and thus the LDH dispersion be improved. More preferably, the organic solvent contains less than 2 weight percent water.

Preferably, the modified layered double hydroxide obtained has a specific surface area ($N_2$) in the range 155 $m^2/g$ to 850 $m^2/g$, preferably 170 $m^2/g$ to 700 $m^2/g$, more preferably 250 $m^2/g$ to 650 $m^2/g$. Preferably, the modified layered double hydroxide has a BET pore volume ($N_2$) greater than 0.1 $cm^3/g$. Preferably, the inventive modified layered double hydroxide has a BET pore volume ($N_2$) in the range 0.1 $cm^3/g$ to 4 $cm^3/g$, preferably 0.5 $cm^3/g$ to 3.5 $cm^3/g$, more preferably 1 to 3 $cm^3/g$.

Further steps in the process may comprise drying the LDH obtained in step c and/or subjecting the LDH to a thermal treatment. The thermal treatment may comprise heat treatment at temperature ranges from room temperature to about 150° C., and/or about 150° C. to 400° C. and/or about 400° C. to 1000° C. Thermal treatment may comprise calcining the LDH (e.g. at a temperature in the range 110° C. to 950° C.).

The inventive process can be called an aqueous miscible organic solvent treatment (AMOST) process. The inventive process can be either a continuous or a batch process.

According to the second object, a layered double hydroxide is provided, prepared according to the inventive process.

Preferably the layered double hydroxide has a BET pore volume ($N_2$) greater than 0.1 $cm^3/g$.

Preferably, the process results in a LDH having a de-aggregation ratio greater than 2, preferably greater than 5, more preferably in the range 5 to 200. De-aggregation ratio is the ratio of the BET surface of the inventive material compared to the material treated in a comparative way. The comparison is based on an identical LDH synthesis in which the water wet LDH is just dried and not been treated with a water miscible solvent. The de-aggregation ratio is closely related to the % decrease in particle densities.

The modified LDHs prepared according to the present invention could be called aqueous miscible organic-LDHs (AMO-LDHs).

The modified LDHs of the present invention have preferably a loose bulk density of 0.1-0.25 g/mL, have preferably a tap density between 0.1-0.35 g/mL, have preferably a GyoPyc tap density of 0.2-0.4 g/mL. The Carr index of an inventive LDH is preferably increased by 0-45% compared to conventionally prepared LDH. Further, the surface area of an inventive LDH is preferably increased by 34-11,000% compared to conventionally prepared LDH, while the pore volume of an inventive LDH may be increased by 11-150,000% compared to a conventionally prepared LDH. Application of the inventive method imparts new thermal characteristics to an inventive LDH compared to a conventionally prepared LDH, as shown by thermogravimetric analysis (TGA).

Preferably, the process results in a LDH having an apparent density of less than 0.8 $g/cm^3$, preferably less than 0.5 $g/cm^3$, more preferably less than 0.4 $g/cm^3$. Apparent density may be determined by the following procedure. The LDH as a free-flowing powder was filled into a 2 mL disposable pipette tip, and the solid was packed as tight as possible by tapping manually for 2 min. The weight of the pipette tip was measured before and after the packing to determine the mass of the LDH. Then the apparent density of LDH was calculated using the following equation:

Apparent density=LDH weight (g)/LDH volume (2 mL)

The LDHs according to the invention are particularly suitable to be used for a large variety of applications.

Applications of these LDHs include use as catalyst supports and in many other applications.

The preferred and optional features of the first and second aspects of the invention are as discussed in relation to the other aspects and as specified in the claims.

Further advantages and features of the subject-matter of the present invention can be taken from the following detailed description taking the drawing into consideration, in which:

FIG. 1. The LDH synthesis procedure including the inventive acetone treatment.

Figure 2:
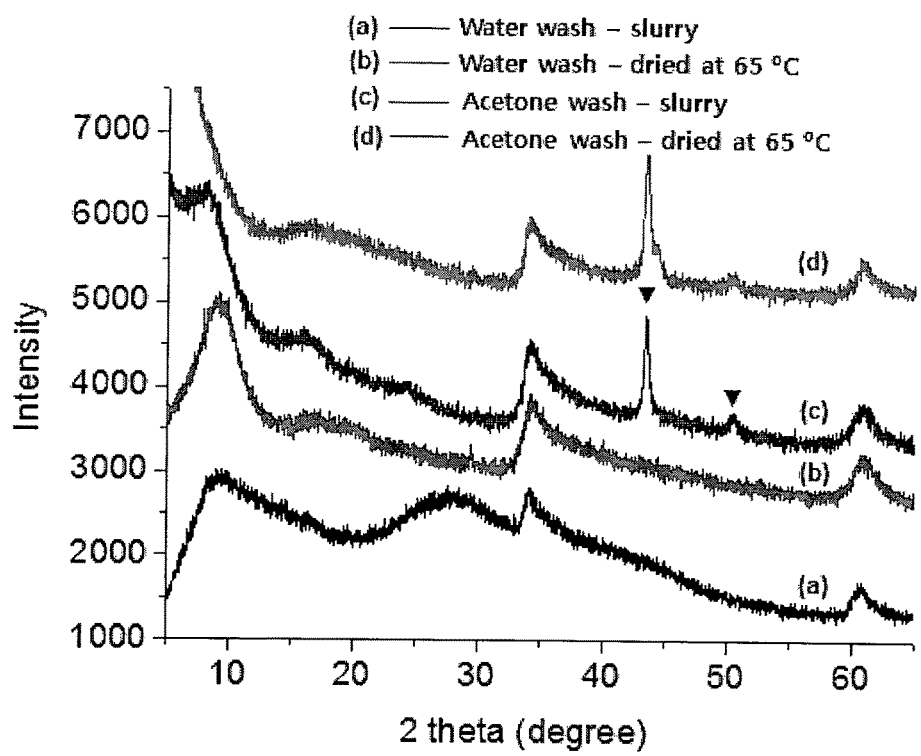
FIG. 2. XRD patterns of Zn$_2$Al-borate LDH (a) slurry after washing with water, (b) dried powder after washing with water, (c) slurry after washing with acetone, and (d) dried powder after washing with acetone. (▼) reflections from sample holder.

FIG. 2. XRD patterns of $Zn_2Al$-borate LDH (a) slurry after washing with water, (b) dried powder after washing with water, (c) slurry after washing with acetone, and (d) dried powder after washing with acetone. (▼) reflections from sample holder.

Figure 3:
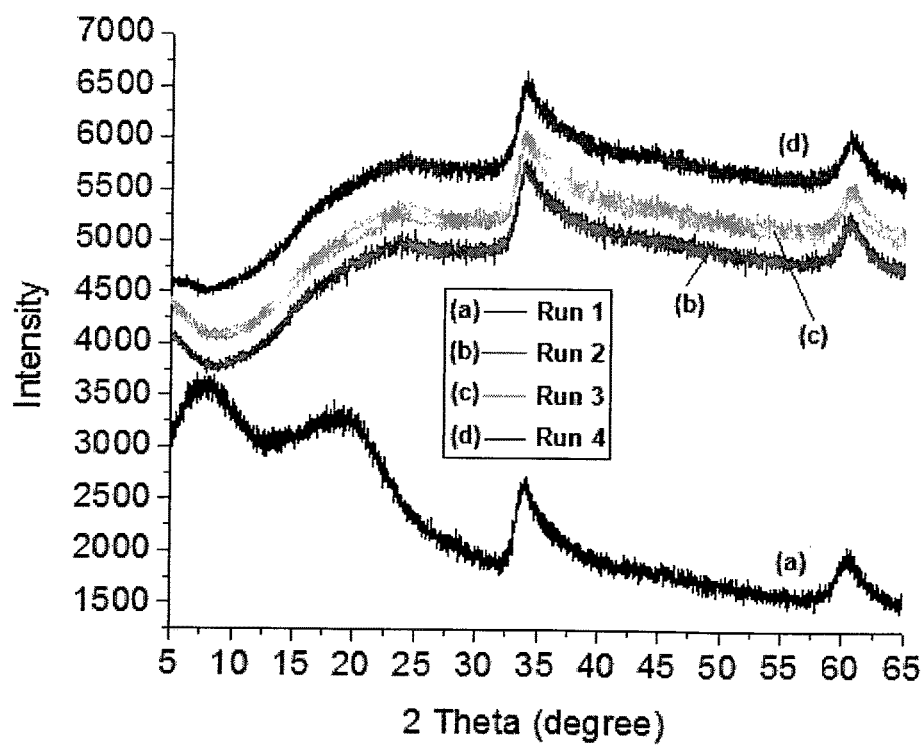
FIG. 3. XRD patterns of acetone washed Zn$_2$Al-borate LDH slurry, (a) run 1, (b) run 2, (c) run 3, and (d) run 4.

FIG. 3. XRD patterns of acetone washed $Zn_2Al$-borate LDH slurry, (a) run 1, (b) run 2, (c) run 3, and (d) run 4.

Figure 4:
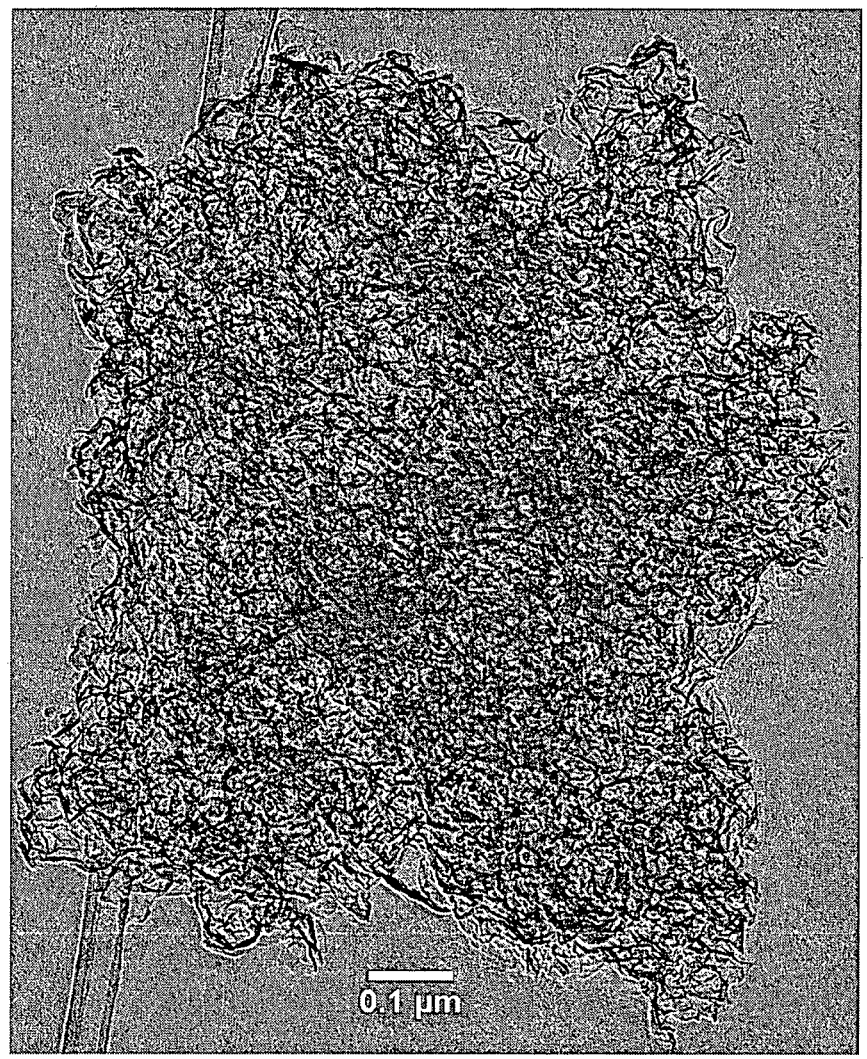
FIG. 4. TEM image of Zn$_2$Al-borate LDH washed with acetone.

FIG. 4. TEM image of $Zn_2Al$-borate LDH washed with acetone.

Figure 5:
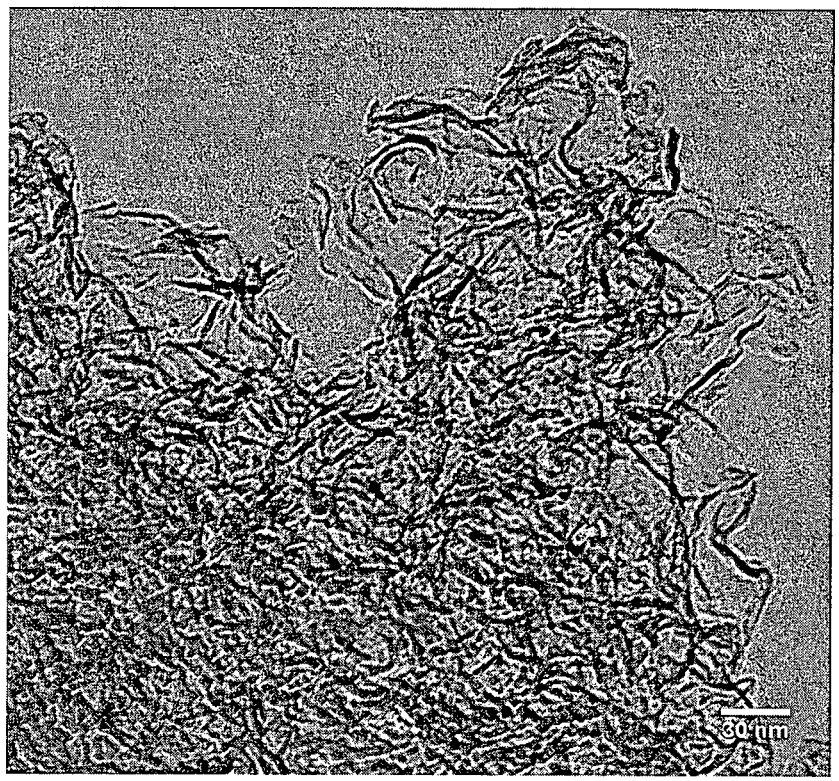
FIG. 5. High resolution TEM image of Zn$_2$Al-borate LDH washed with acetone.

FIG. 5. High resolution TEM image of $Zn_2Al$-borate LDH washed with acetone.

Figure 6:
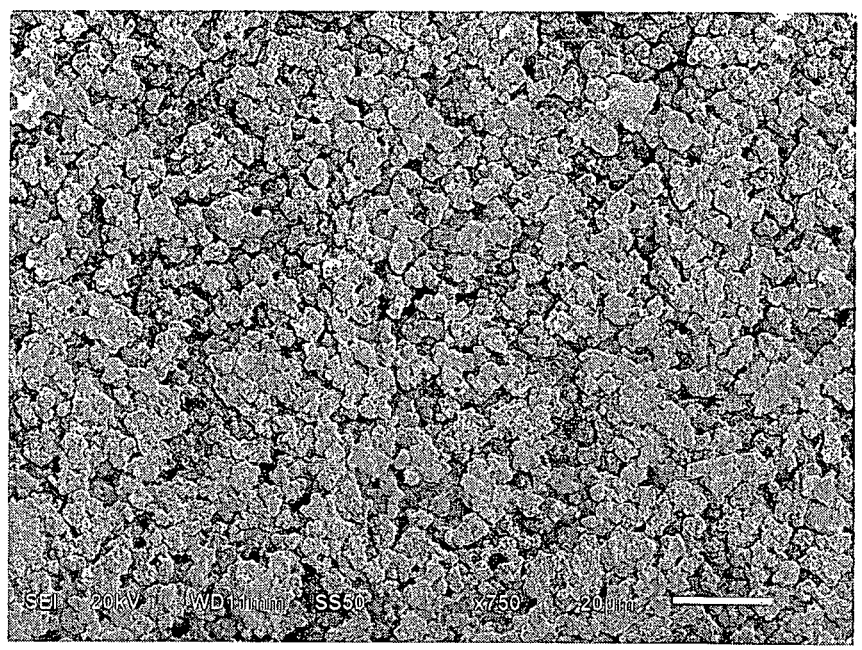
FIG. 6. SEM of Zn$_2$Al-borate LDH washed with acetone.

FIG. 6. SEM of $Zn_2Al$-borate LDH washed with acetone.

Figure 7:
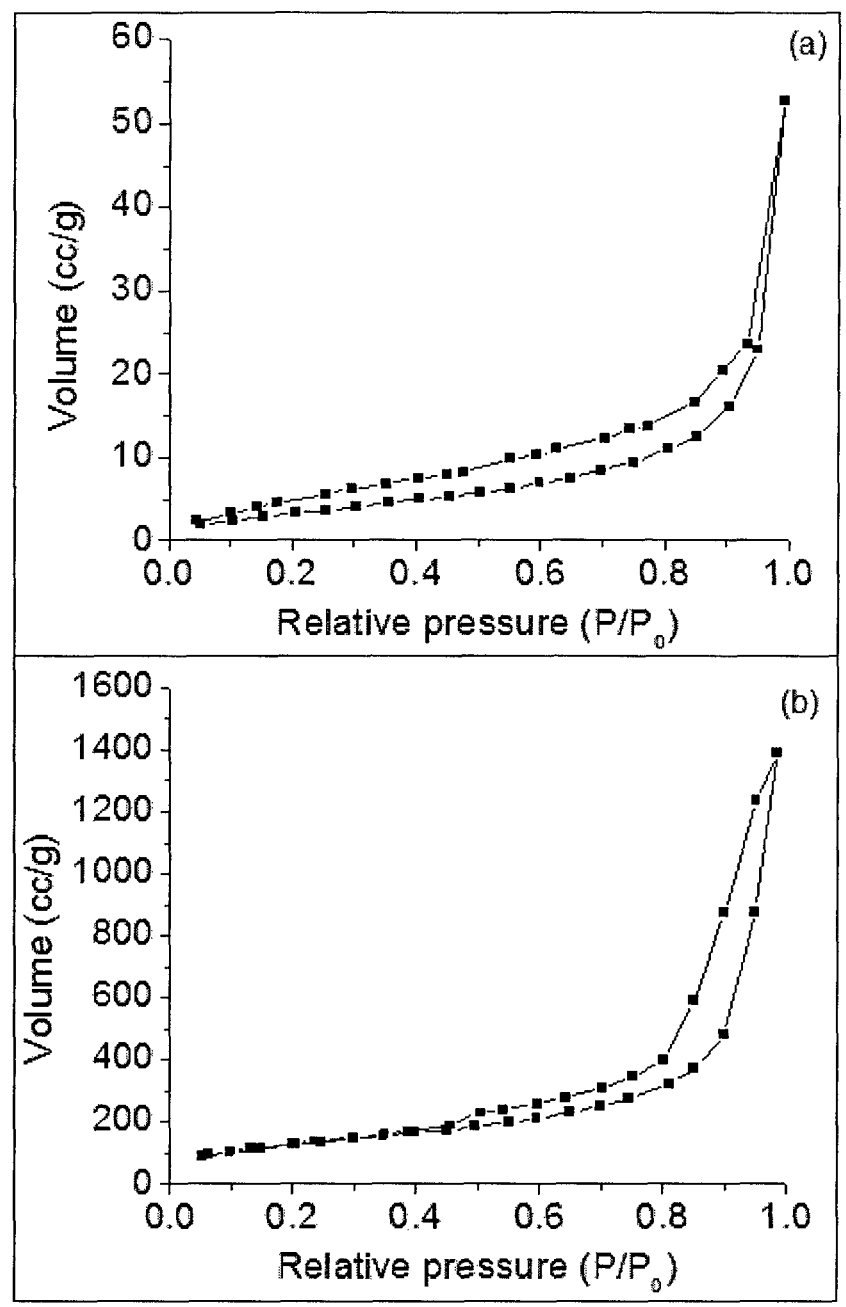
FIG. 7. Nitrogen absorption isotherm of Zn$_2$Al-borate LDHs washed with (a) water, and (b) acetone in BET analysis.

FIG. 7. Nitrogen absorption isotherm of $Zn_2Al$-borate LDHs washed with (a) water, and (b) acetone in BET analysis.

Figure 8:
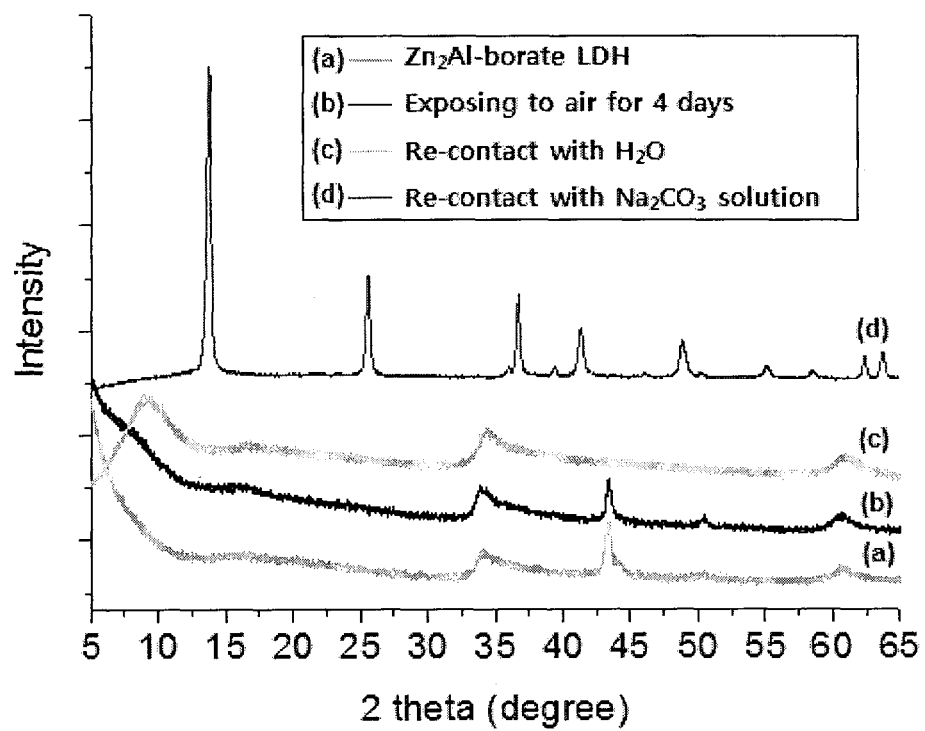
FIG. 8. XRD patterns of acetone washed Zn$_2$Al-borate LDH (a) dried powder, (b) exposed to air for 4 days, (c) re-contacted with H$_2$O, and (d) re-contact with Na$_2$CO$_3$ solution.

FIG. 8. XRD patterns of acetone washed $Zn_2Al$-borate LDH (a) dried powder, (b) exposed to air for 4 days, (c) re-contacted with $H_2O$, and (d) re-contact with $Na_2CO_3$ solution.

Figure 9:
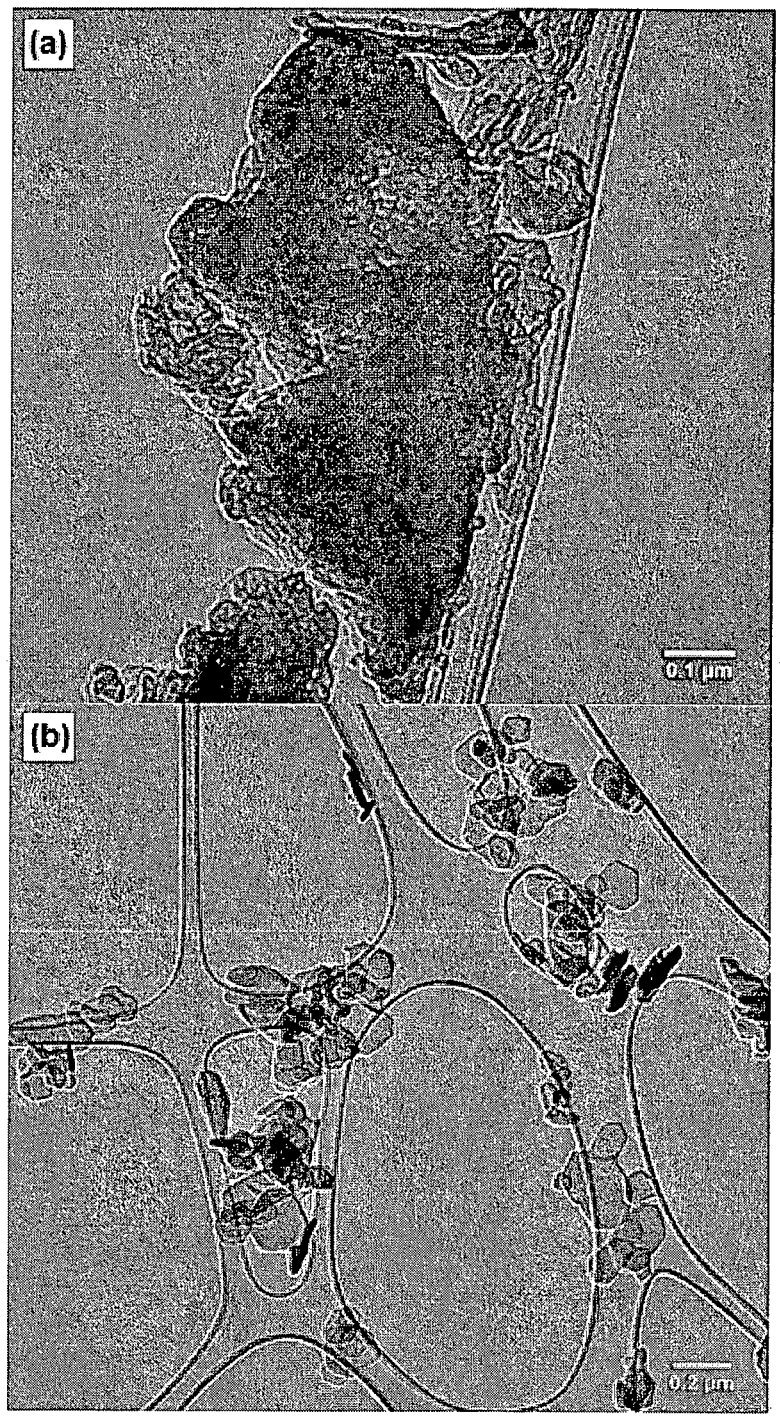
FIG. 9. TEM image of acetone washed Zn$_2$Al-borate LDH after re-contacting with (a) H$_2$O and (b) Na$_2$CO$_3$ aqueous solution.

FIG. 9. TEM image of acetone washed $Zn_2Al$-borate LDH after re-contacting with (a) $H_2O$ and (b) $Na_2CO_3$ aqueous solution.

Figure 10:
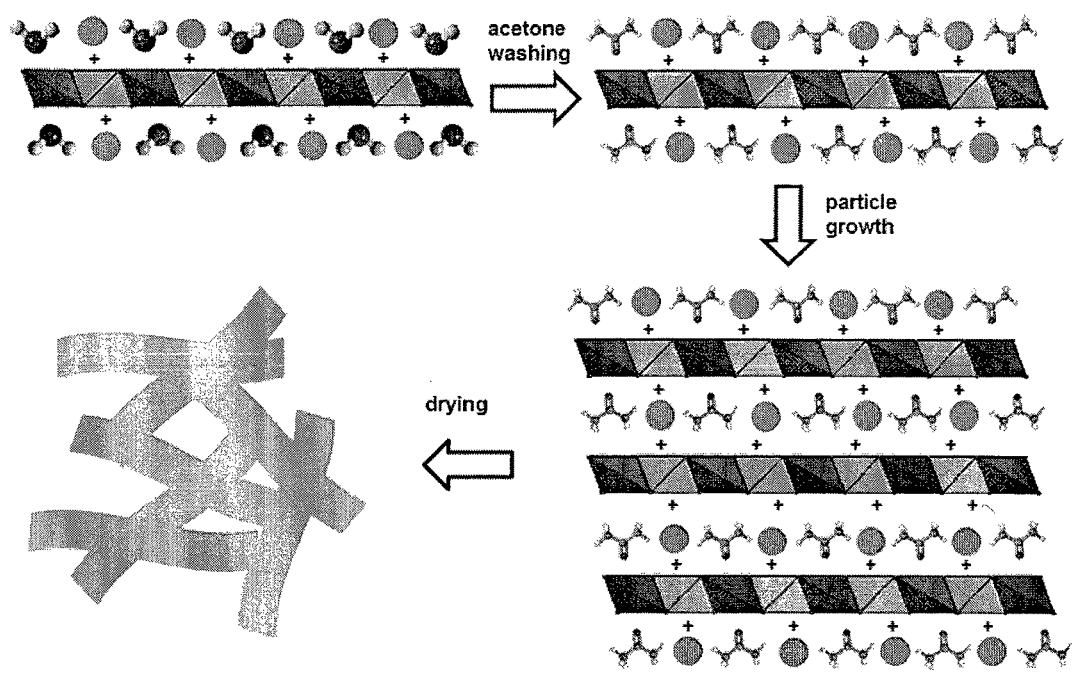
FIG. 10. The LDH particle growth steps during acetone washing.

FIG. 10. The LDH particle growth steps during acetone washing.

Figure 11:
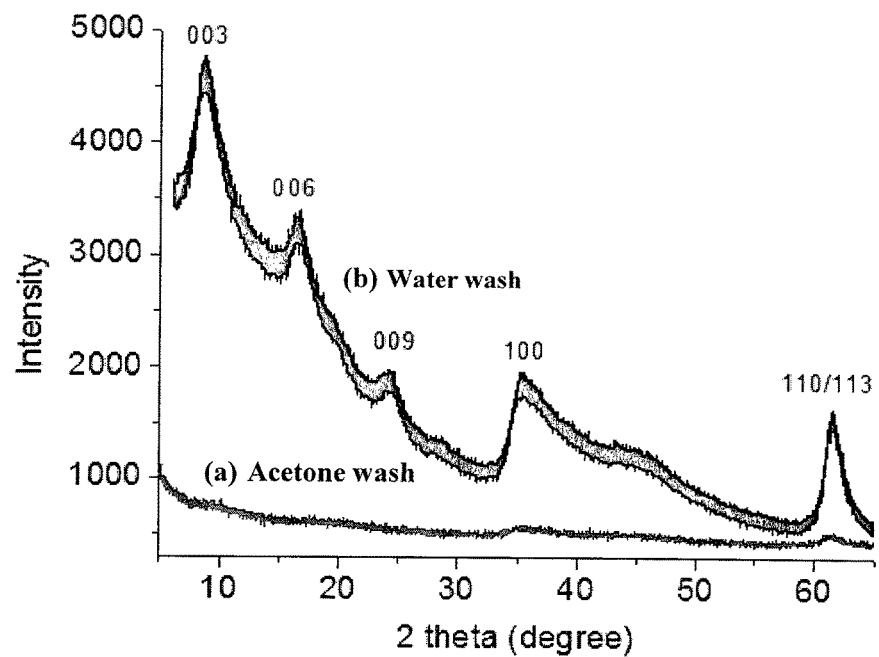
FIG. 11. XRD patterns of Mg$_3$Al-borate LDH washed with (a) water and (b) acetone.

FIG. 11. XRD patterns of $Mg_3Al$-borate LDH washed with (a) water and (b) acetone.

Figure 12:
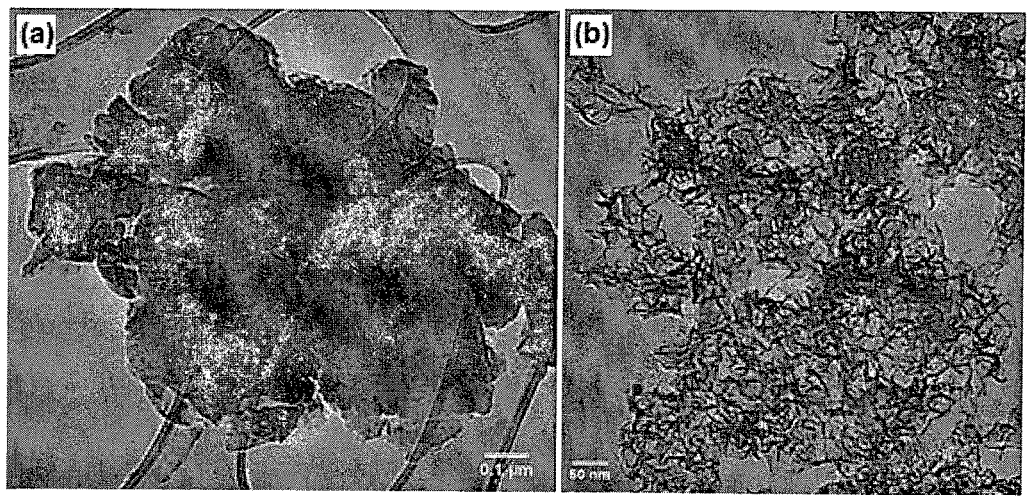
FIG. 12. TEM images of Mg$_3$Al-borate LDH washed with (a) water and (b) acetone.

FIG. 12. TEM images of $Mg_3Al$-borate LDH washed with (a) water and (b) acetone.

Figure 13:
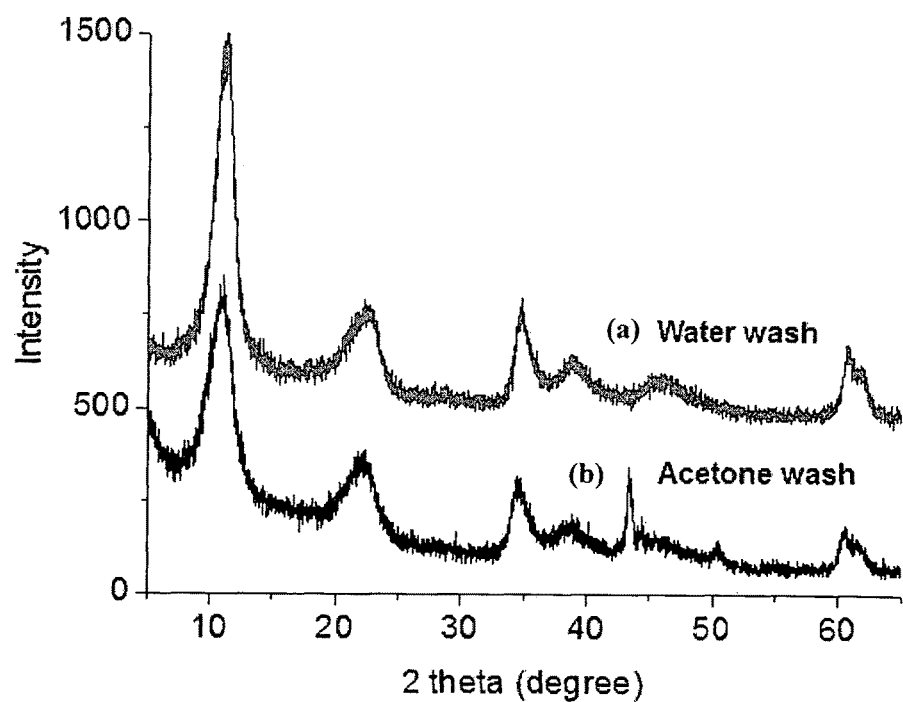
FIG. 13. XRD patterns of Mg$_3$Al—NO$_3$ LDH washed with (a) water and (b) acetone.

FIG. 13. XRD patterns of $Mg_3Al$—$NO_3$ LDH washed with (a) water and (b) acetone.

Figure 14:
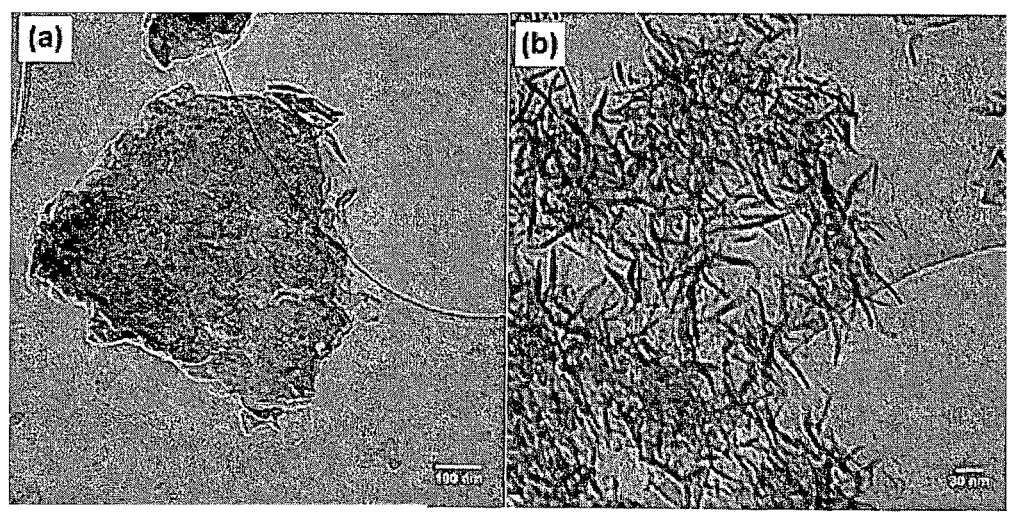
FIG. 14. TEM image of Mg$_3$Al—NO$_3$ LDH washed with (a) water and (b) acetone.

FIG. 14. TEM image of $Mg_3Al$—$NO_3$ LDH washed with (a) water and (b) acetone.

Figure 15:
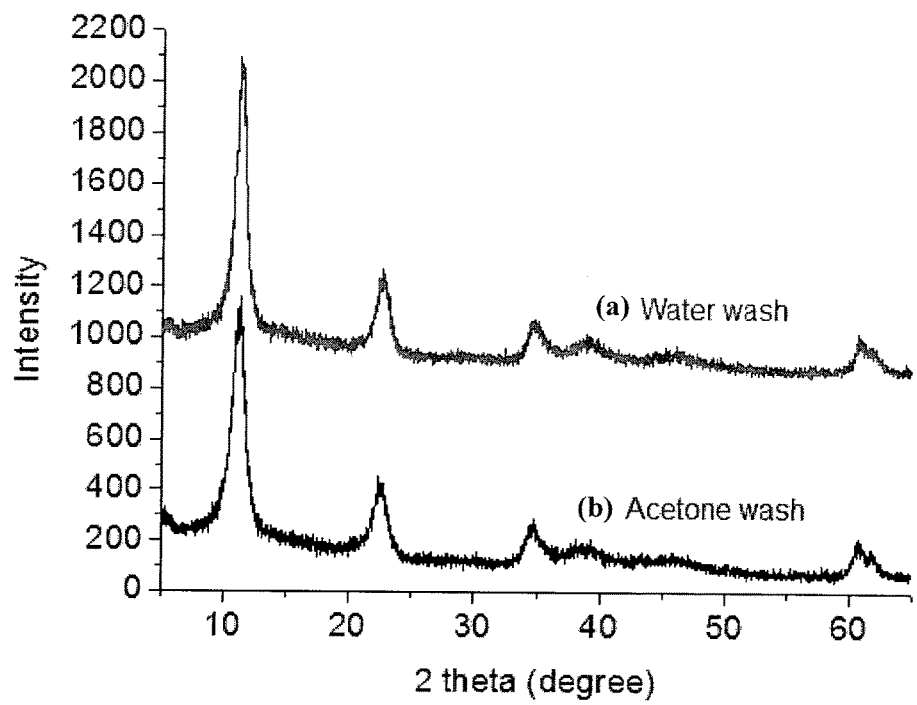
FIG. 15. XRD patterns of Mg$_3$Al—Cl LDH washed with (a) water and (b) acetone.

FIG. 15. XRD patterns of $Mg_3Al$—Cl LDH washed with (a) water and (b) acetone.

Figure 16:
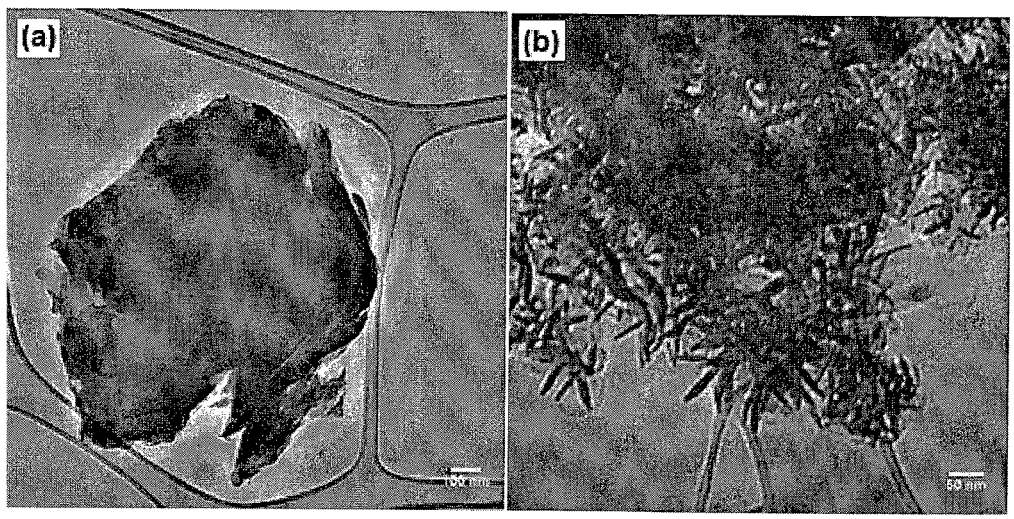
FIG. 16. TEM images of Mg$_3$Al—Cl LDH washed with (a) water and (b) acetone.

FIG. 16. TEM images of $Mg_3Al$—Cl LDH washed with (a) water and (b) acetone.

Figure 17:
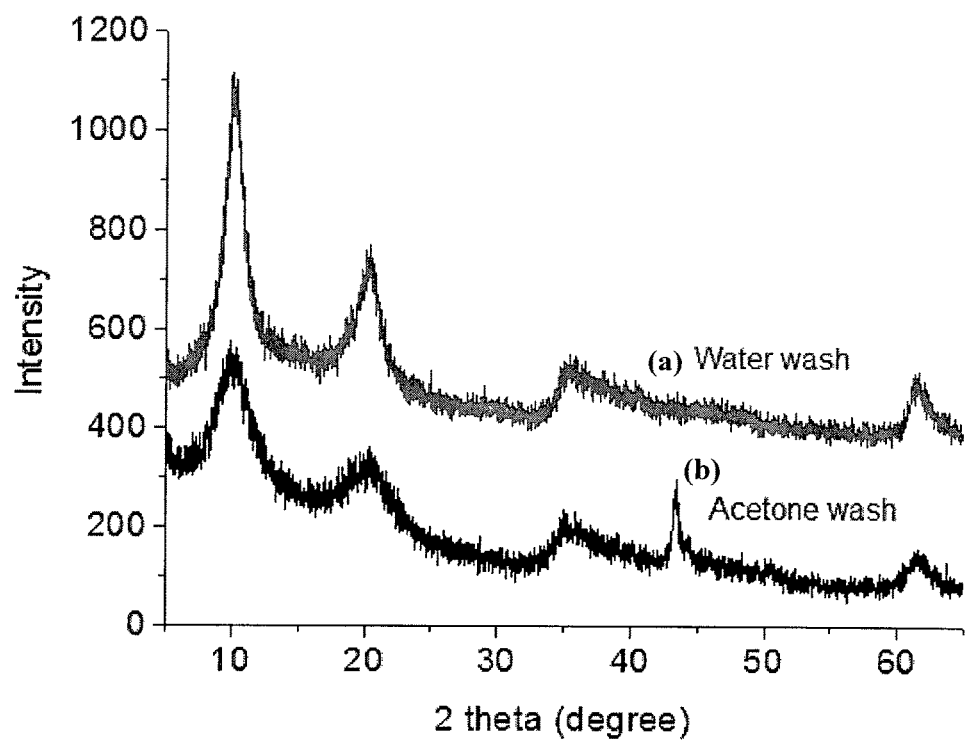
FIG. 17. XRD patterns of Mg$_3$Al—SO$_4$ LDH washed with (a) water and (b) acetone.

FIG. 17. XRD patterns of $Mg_3Al$—$SO_4$ LDH washed with (a) water and (b) acetone.

Figure 18:
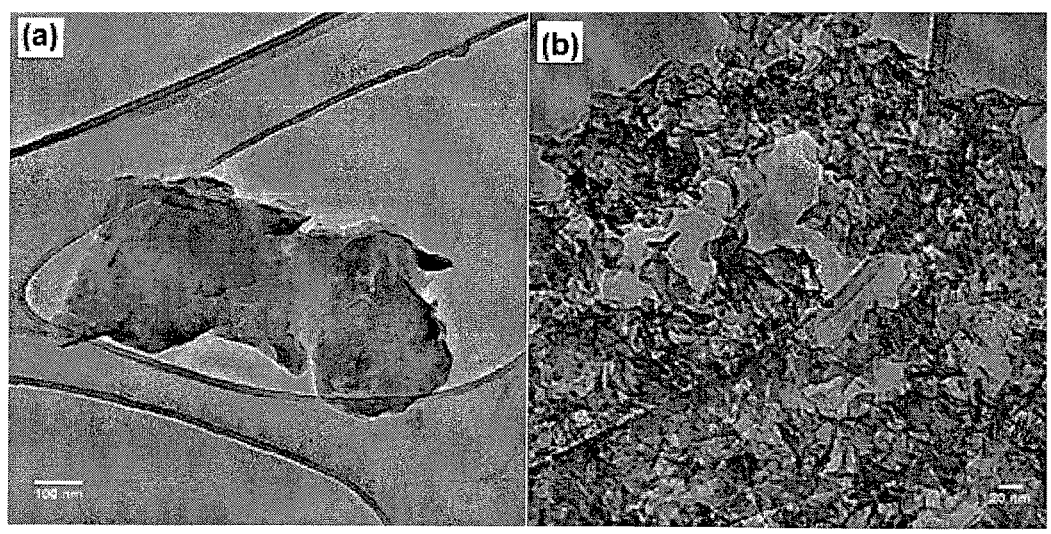
FIG. 18. TEM images of Mg$_3$Al—SO$_4$ LDH washed with (a) water and (b) acetone.

FIG. 18. TEM images of $Mg_3Al$—$SO_4$ LDH washed with (a) water and (b) acetone.

Figure 19:
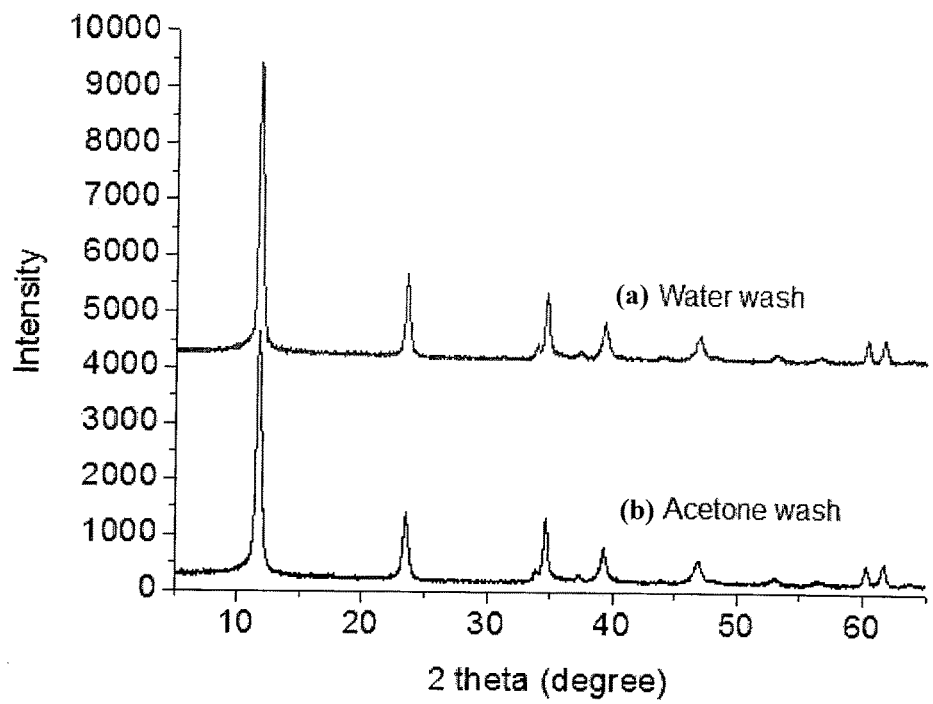
FIG. 19. XRD patterns of Zn$_3$Al—NO$_3$ LDH washed with (a) water and (b) acetone.

FIG. 19. XRD patterns of $Zn_3Al$—$NO_3$ LDH washed with (a) water and (b) acetone.

Figure 20:
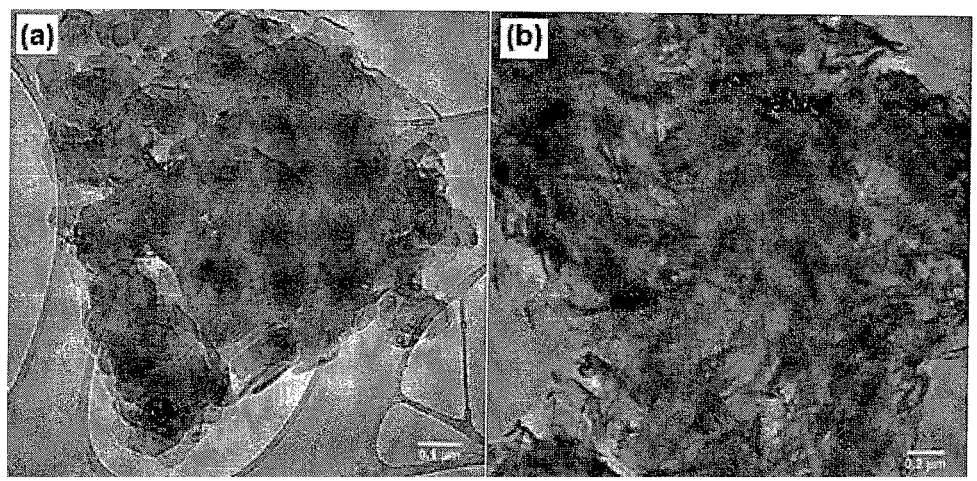
FIG. 20. TEM image of Zn$_3$Al—NO$_3$ LDH washed with (a) water and (b) acetone.

FIG. 20. TEM image of $Zn_3Al$—$NO_3$ LDH washed with (a) water and (b) acetone.

Figure 21:
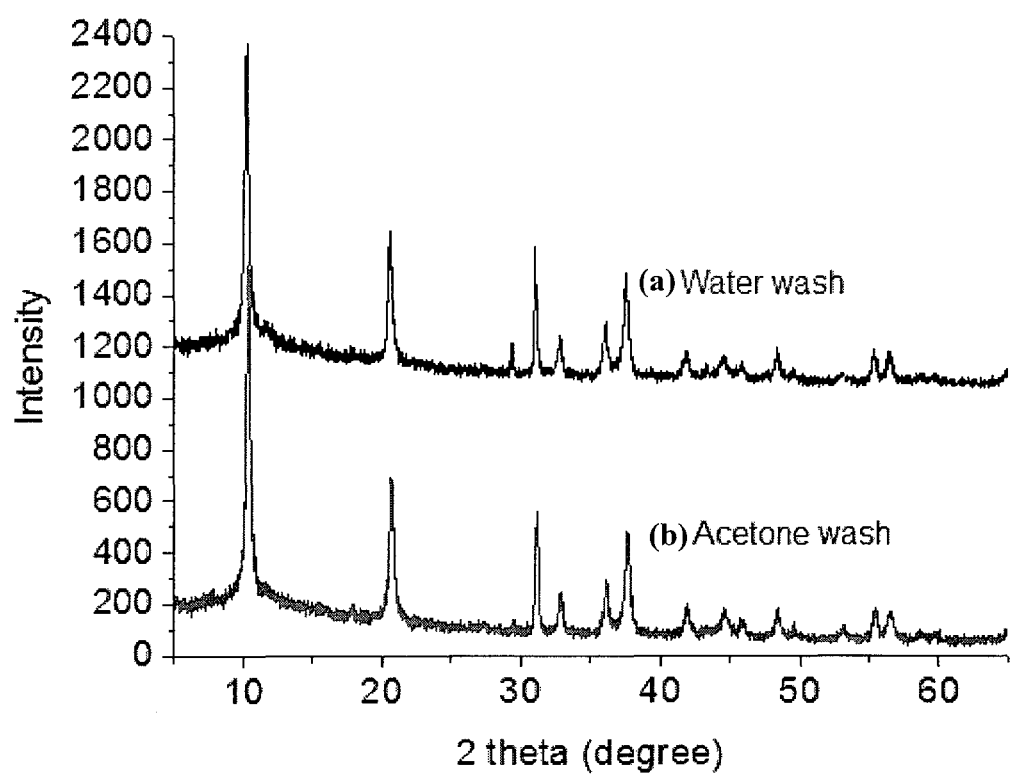
FIG. 21. XRD patterns of Ca$_2$Al—NO$_3$ LDH washed with (a) water and (b) acetone.

FIG. 21. XRD patterns of $Ca_2Al$—$NO_3$ LDH washed with (a) water and (b) acetone.

Figure 22:
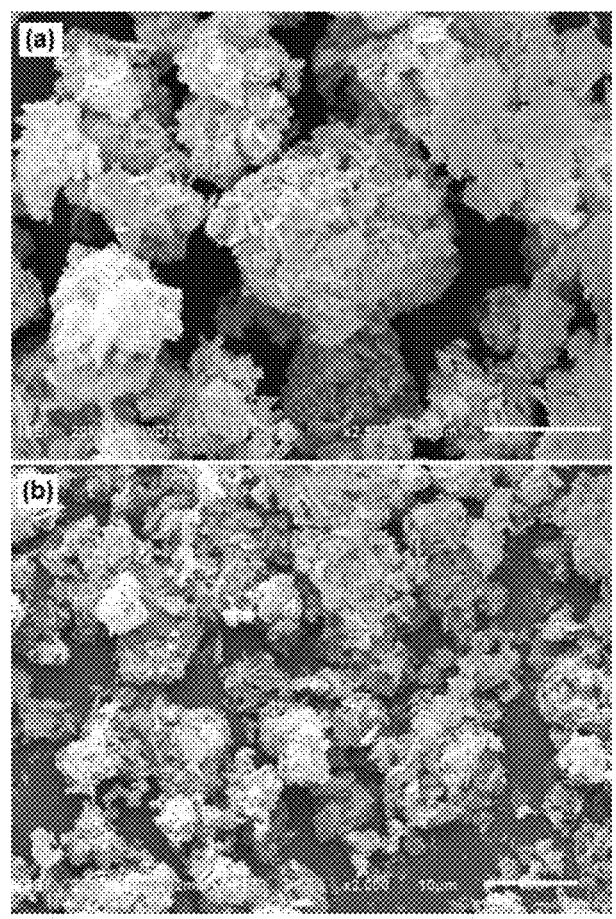
FIG. 22. SEM images of Ca$_2$Al—NO$_3$ LDH washed with (a) water and (b) acetone.

FIG. 22. SEM images of $Ca_2Al$—$NO_3$ LDH washed with (a) water and (b) acetone.

Figure 23:
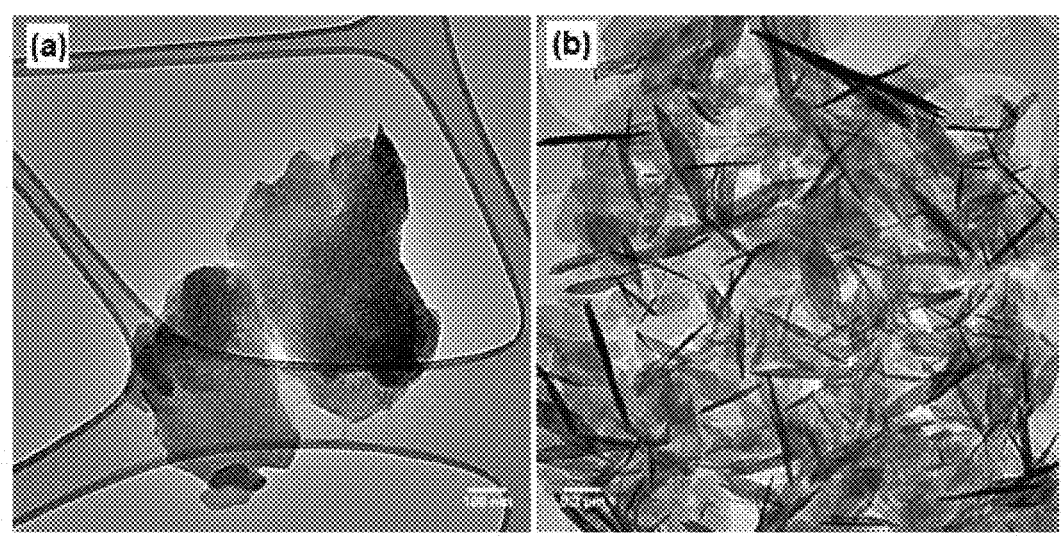
FIG. 23. TEM images of Ca$_2$Al—NO$_3$ LDH washed with (a) water and (b) acetone.

FIG. 23. TEM images of $Ca_2Al$—$NO_3$ LDH washed with (a) water and (b) acetone.

Figure 24:
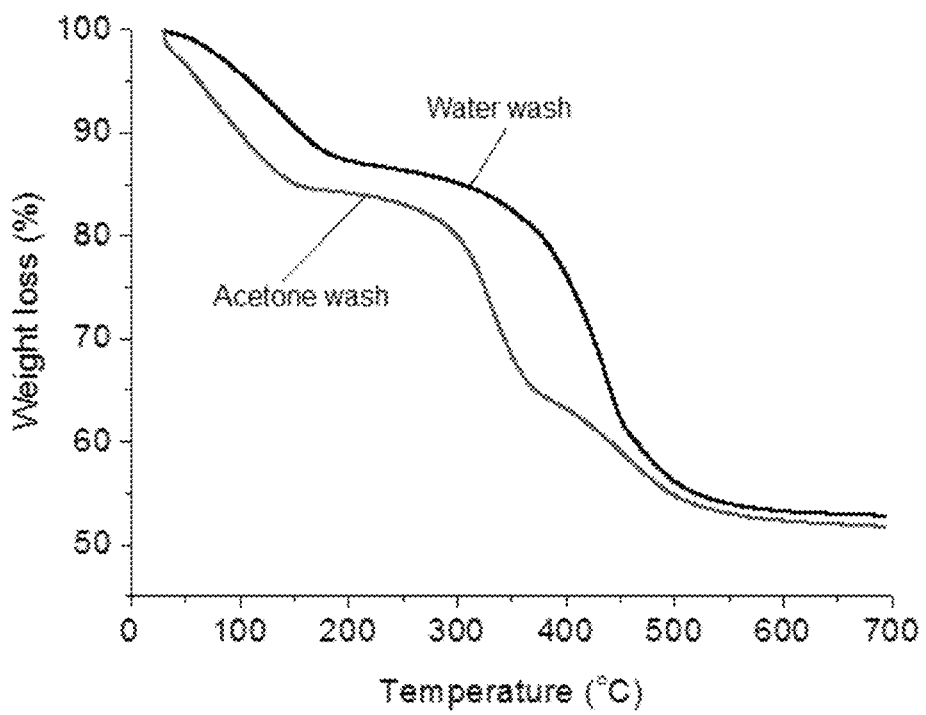
FIG. 24. TGA analysis of Mg$_3$Al—NO$_3$ LDH washed with water and acetone.

FIG. 24. TGA analysis of $Mg_3Al$—$NO_3$ LDH washed with water and acetone.

Figure 25:
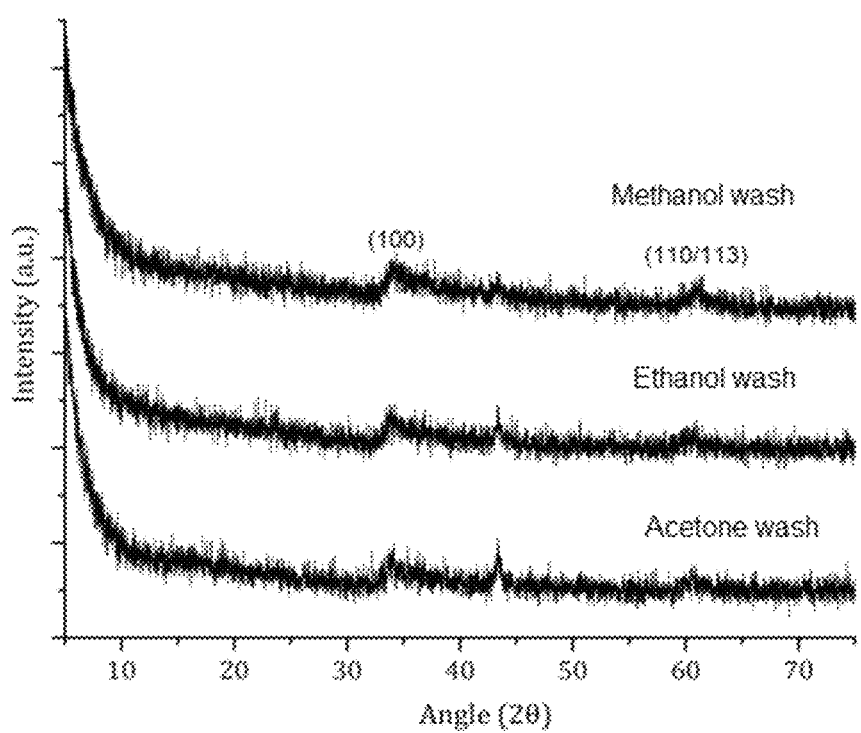
FIG. 25. XRD patterns of Zn$_2$Al-borate LDHs washed with acetone, ethanol and methanol.

FIG. 25. XRD patterns of $Zn_2Al$-borate LDHs washed with acetone, ethanol and methanol.

FIG. 26. TGA and DTG analysis of $Mg_3Al$—$NO_3$-10 LDHs (a) in the range of 30-600° C. and (b) in the range of 30-230° C. $Mg_3Al$—$NO_3$-10-W was prepared by a conventional coprecipitation method in water at pH 10, while $Mg_3Al$—$NO_3$-10-A was prepared under identical conditions in water at pH 10 according to the method of the present invention using acetone as the solvent.

The invention is further illustrated by the following Examples.

Examples

1. Synthesis Methods for LDH 1.1 Conventional Co-Precipitation Method— a metal precursor solution is added dropwise into an anion solution, and the pH of precipitation solution is adjusted to a predetermined value using a NaOH solution in water. The precipitant is aged at a predetermined temperature for about 12 h. LDH is collected by filtration and washing with water, followed by drying at 65° C.

Further, it is well known in the art that other synthesis methods for LDHs are known, such as use of controlled hydrolysis of urea or a related organic compound, hydrothermal synthesis, or sol-gel methods.

1.2 Inventive Method with Solvent Treatment— the inventive method is designed based on the coprecipitation method as described above, but the water washed "wet cake" is redispersed in acetone. After stirring for about 1-2 h, the sample is filtered and washed with acetone. The final LDH product is dried at 65° C. Comparing to the coprecipitation method, a simple solvent/acetone treatment step is added before the LDH "wet cake" is dried. Such a simple step surprisingly results in a very different LDHs product with much higher surface area. The synthesis procedure is illustrated in FIG. 1.

2. Characterization Methods

X-Ray Diffraction (XRD)—

XRD patterns were recorded on a PANalytical X'Pert Pro instrument in reflection mode with Cu Kα radiation. The accelerating voltage was set at 40 kV with 40 mA current ($\kappa$=1.542 Å) at 0.01° $s^{-1}$ from 1° to 70° with a slit size of ¼ degree.

Fourier Transform Infrared Spectroscopy (FT-IR)—

FT-IR spectra were recorded on a Bio-Rad FTS 6000 FTIR Spectrometer equipped with a DuraSampIIR II diamond accessory in attenuated total reflectance (ATR) mode in the range of 400-4000 $cm^{-1}$; 100 scans at 4 $cm^{-1}$ resolution were collected. The strong absorption in the range 2500-1667 $cm^{-1}$ was from the DuraSampIIR II diamond surface.

Transmission Electron Microscopy (TEM)—

TEM analysis was performed on JEOL 2100 microscope with an accelerating voltage of 400 kV. Samples were dispersed in ethanol with sonication and then cast onto copper TEM grids coated with lacey carbon film.

Scanning Electron Microscopy (SEM) and Energy Dispersive X-Ray Spectrometry (EDS)—

SEM and SEM-EDS analyses were performed on a JEOL JSM 6100 scanning microscope with an accelerating voltage of 20 kV. Powder samples were spread on carbon tape adhered to an SEM stage. Before observation, the samples were sputter coated with a thin Platinum layer to prevent charging and to improve the image quality.

BET Specific Surface Areas—

BET specific surface areas were measured from the $N_2$ adsorption and desorption isotherms at 77 K collected from a Quantachrome Autosorb-6B surface area and pore size analyzer. Before each measurement, LDH samples were first degassed overnight at 110° C.

Thermal Gravimetric Analysis (TGA)—

The thermal stability of LDHs was studied by TGA (Netzsch) analysis, which was carried out with a heating rate of 10° C. min$^{-1}$ and an air flow rate of 50 mL min$^{-1}$ from 25 to 700° C.

The apparent density was determined using the following procedure. The LDH as a free-flowing powder was filled into a 2 mL disposable pipette tip, and the solid was packed as tight as possible by tapping manually for 2 minutes. The weight of the pipette tip was measured before and after the packing to determine the mass of the LDH. Then the apparent density of LDH was calculated using the following equation:

Apparent density=LDH weight (g)/LDH volume (2 mL).

Loose Bulk Density—

The Loose Bulk Density was determined by the following procedure: The freely flowing powder was poured into a graduated cylinder (10 mL) using the solid addition funnel. The cylinder containing the powder was tapped once and the volume measured. The Loose Bulk Density was determined using Equation (1).

$$\text{Loose Bulk Density} = \frac{m}{V_0} \quad (1)$$

Where m is the mass of the powder in the graduated cylinder, $V_0$ is the powder volume in the cylinder after one tap.

3. Synthesis of $Zn_2$Al-Borate and $Mg_3$Al-Borate LDHs

Synthesis of $Zn_2$Al-borate LDH (Chemical Formulas $Zn_{0.67}Al_{0.33}(OH)_2(B_4O_5(OH)_4)_{0.125} \cdot 0.34(H_2O) \cdot 0.11$(acetone))—$Zn_2$Al-borate LDH was prepared by adding 100 mL $Zn(NO_3)_2 \cdot 6H_2O$ (0.075 mol) and $Al(NO_3)_3 \cdot 9H_2O$ (0.0375 mol) solution drop-wise into a 100 mL $H_3BO_3$ (0.187 mol) solution. The pH of the precipitation solution was controlled at about 8.3 using a NaOH (1 M) solution. During the whole synthesis, the system was protected with $N_2$ gas to prevent the contamination by atmosphere $CO_2$. The mixture was aged at 65° C. for overnight. The LDH product was first filtered and washed with water to give a "water-wet cake". Then the "water-wet cake" was redispersed in acetone solution. After stirring for about 1-2 h, the sample was filtered and washed with acetone. The final LDH product was dried at 65° C.

Synthesis of $Mg_3$Al-Borate LDH—

$Mg_3$Al-borate LDH (Chemical Formula $Mg_{0.75}Al_{0.25}(OH)_2(B_4O_5(OH)_4)_{0.125} \cdot 0.53 (H_2O) \cdot 0.21$(acetone)) was prepared by adding 100 mL $Mg(NO_3)_2 \cdot 6H_2O$ (0.075 mol) and $Al(NO_3)_3 \cdot 9H_2O$ (0.025 mol) solution drop-wise into a 100 mL $H_3BO_3$ (0.187 mol) solution. The pH of the precipitation solution was controlled at about 9 using a NaOH (1 M) solution. During the whole synthesis, the system was protected with $N_2$ gas to prevent the contamination by atmosphere $CO_2$. The mixture was aged at 65° C. overnight. The LDH product was first filtered and washed to give a "water-wet cake". Then the "water-wet cake" was redispersed in acetone solution again. After an adequate stirring for about 1-2 h, the sample was filtered and washed with acetone. The final LDH product was dried at 65° C.

The XRD patterns of $Zn_2$Al-borate LDH synthesized by the conventional co-precipitation method (LDH was washed with water until pH close to 7 and dried at 65° C. in oven) shows five characteristic peaks of $Zn_2$Al-borate LDH observed at 8.3°, 16.5°, 24.1°, 34.3°, and 60.8°, which can be index to the reflections of (003), (006), (009), (100), and (110/113) planes, respectively. According to the Bragg equation, the d-spacing was calculated as 1.05 nm, which is consistent with the previous reported values. Subtracting 0.46 nm, the thickness of one brucite layer, gives the interlayer spacing of 0.59 nm, indicating that the borate species is intercalated into the inter-layers. The morphology and the particle size distribution were characterized using SEM and TEM and indicates that nanoplatelets conventionally produced aggregate severely after being dried, forming particles with an average size of 10 s of micrometers. It is thought that freshly prepared LDH nanoplatelets washed with water, have a surface surrounded by water molecules due to its high surface charge density. During the drying process nanoplatelets recombine together and grow to big particles. Such $Zn_2$Al-borate LDHs are generally nonporous, with a very low surface area less than 15 m$^2$/g.

In the inventive process it was noticed that dispersing in acetone has a great effect on the properties of the final LDH samples. Therefore, after being washed with water to pH=7, the water-wet $Zn_2$Al-borate LDH slurry is re-dispersed in acetone and washed with acetone thoroughly, followed by drying at 65° C. The structural changes during each step were monitored using XRD, as shown in FIG. 2. For the water washed sample, the 001 reflections were observed for both the slurry and dried powder, and they had a very similar XRD pattern. However, with a further washing with acetone, a lower 003 reflection was seen with the slurry, which may be due to the replacement of the interlayer water molecules by acetone molecules. More interestingly, when the acetone washed slurry was dried, the 001 reflections disappeared while the 100 and 110/113 reflections remained, suggesting that the LDH was exfoliated. In addition, the acetone washed samples became so fine and light that the X-ray can pass through the samples, with the Nickel sample holder was detected at 43.4° and 50.4°. It was also confirmed that these two impurity peaks can be avoided with a deeper sample holder.

In order to further confirm that the exfoliation of $Zn_2$Al-borate LDH is purely due to the loss of acetone molecules, another experiment was conducted, as shown in FIG. 3. Acetone washed slurry was put in a deep XRD sample holder, and its XRD pattern was recorded immediately (FIG. 3(a)). After that, three more runs were carried out with the same sample (FIG. 3(a-d)), and each run was fixed to 30 min. It was noticed that for the first run, when the acetone molecules were still in the LDH sample, the 001 reflections can be detected. However, only after 30 min in air, the sample lost its 001 reflections. Further exposure to air did not change its XRD patterns. This result clearly demonstrated that the evaporation (loss) of acetone molecules can result in an exfoliated $Zn_2Al$-borate LDH.

The exfoliation of $Zn_2Al$-borate LDH was further examined by TEM analysis, as shown in FIG. 4 and FIG. 5. After being washed with acetone, highly porous, sponge-like particles were obtained. This morphology is very much different from the water washed sample. The exfoliated $Zn_2Al$-borate LDH single layer can be clearly seen in HRTEM images (see FIG. 5). It can also be seen that the exfoliated single layers were curved and irregular compared with the ordered, layered structure of the water washed sample. It is believed that the curving of the single layers led to the disordering of LDH along the z-axis direction, explaining why the 001 reflections disappeared with this sample. The SEM image in FIG. 6 indicates that the acetone washed sample has a dramatic different morphology and particle size compared with the water washed samples. Washing with water produced large particles with an uneven, aggregated morphology. Acetone washed $Zn_2Al$-borate LDH has a significantly smaller particle size with a more uniform, spherical morphology.

According to the fact that the acetone washed $Zn_2Al$-borate LDH is exfoliated into single layers and curved, inventors expect it should have an extremely high specific surface area and high pore volume.

FIG. 7 shows the $N_2$ adsorption/desorption isotherm curves for water washed and acetone washed $Zn_2Al$-borate LDHs. Both of them showed a H3 type hysteresis loop, which does not exhibit any limiting adsorption at the high $P/P_0$. It indicates that these LDHs are aggregates of plate-like particles giving rise to slit-shaped pores. This is consistent with the SEM and TEM analyses. For acetone washed sample, the $N_2$ adsorption/desorption behaviour mainly occurred at the higher $P/P_0$ region, suggesting that it possesses larger pores than water washed sample. After being washed with acetone, both the specific surface area (from 13.4 to 301.0 $m^2/g$) and the total pore volume (from 0.08 to 2.15 cc/g) were significantly increased, see Table 1. The BET analysis is consistent with other characterizations and further confirms that the $Zn_2Al$-borate LDH was de-aggregated by acetone washing and drying. The BET analysis also suggests that the acetone washed $Zn_2Al$-borate LDH has superior advantages as catalyst/support, adsorbent, nanocomposite filler, and so on.

TABLE 1

Specific surface area and total pore volume of $Zn_2Al$-borate washed with water or acetone.

| Samples | Specific surface area ($m^2/g$) | Total pore volume (cc/g) |
| --- | --- | --- |
| $Zn_2Al$-borate, water wash | 13.4 | 0.08 |
| $Zn_2Al$-borate, acetone wash | 301.0 | 2.15 |

Memory effect is a characteristic of LDH, in which the destroyed layered structures can be reconstructed under certain circumstances. Different conditions were examined, (1) exposing to atmosphere for 4 days, (2) re-contact with $H_2O$, and (3) re-contact with $Na_2CO_3$ solution. The final products were checked using XRD analysis, as shown in FIG. 8. After being exposed to air for 4 days, a very weak 003 reflection was observed for the acetone washed LDH dry powder, which indicates that the exfoliated LDH single layers started to recombined and the regular layered structure is partially reconstructed. This structure change is believed to be driven by the adsorption of water molecules from atmosphere. The reconstruction process is so slow that the structure change is not significant. However, if the acetone washed LDH sample is immersed in water for 2 h, a very strong 003 peak was observed. And the XRD pattern is similar to that of the water washed LDH sample, indicating that the exfoliated LDH single layers recombined in the presence of water and completely reconstructed into its original regular layered structure, FIG. 9(*a*). When the acetone washed sample was immersed in a $Na_2CO_3$ solution, highly crystallized $Zn_2Al$—$CO_3$ LDH was obtained. This is reasonable because $CO_3^{2-}$ has higher negative charge and is preferably intercalated into the LDH gallery than $B_3O_3$(OH)$^-_4$, FIG. 9(*b*). This result shows that the exfoliated $Zn_2Al$-borate LDH still possesses the memory effect property.

A possible mechanism for the effects of the invention is illustrated in FIG. 10. For water washing, due to its high surface charge and hydrophilic property, the LDH nanoplates will be surrounded by water molecules. During the drying step, LDH plates will combine together and grow to bigger particles. In other words, the drying step acts as another aging step for the water washed LDH slurry. However, for the acetone washed LDH sample, the water molecules on LDH surface will be washed off and replaced by acetone molecules. Then during the drying step, acetone molecules will be easily evaporated, leading to the formation of highly dispersed and highly porous LDHs.

Similar phenomena were observed with $Mg_3Al$-borate LDH. FIG. 11 shows that after being washed with acetone, the Bragg diffractions disappeared, indicating that the LDH was exfoliated by the acetone treatment. SEM images clearly shows that the water washed sample consists of very big and chunky nonporous LDH particles, while the acetone washed sample becomes highly porous and is composed of very small and uniform LDH particles. TEM images in FIG. 12 reveals that the water washed LDH is plate-like particles which aggregated severally, while the acetone washed LDH becomes flower-like particles. Such big difference in the structure and morphology of these two samples is solely due to a simple acetone treatment and will lead to significantly different performance in many fields such as catalysts, catalyst supports, adsorbents, etc.

4. Synthesis of Other LDHs

Synthesis of $Mg_3Al$—$NO_3$ LDH—

$Mg_3Al$—$NO_3$ LDH (Chemical Formula: $Mg_{0.75}Al_{0.25}$(OH)$_2$(NO$_3$)$_{0.25}$.0.38 (H$_2$O).0.12(acetone)) was synthesized by adding 50 mL Mg(NO$_3$)$_2$.6H$_2$O (0.0375 mol) and Al(NO$_3$)$_3$.9H$_2$O (0.0125 mol) solution drop-wise into a 50 mL NaNO$_3$ (0.025 mol) solution. The pH of the precipitation solution was controlled at about 10 using a NaOH solution (4 M). The obtained LDHs were filtered and washed with $H_2O$ until pH=7. In order to show a direct comparison, half of the "water-wet cake" was dried conventionally at 65° C., and the other half was redispersed in acetone solution again. After an adequate stirring for about 1-2 h, the sample was filtered and washed with acetone, followed by a drying step at 65° C.

Synthesis of $Mg_3Al$—Cl LDH—

$Mg_3Al$—Cl LDH (Chemical Formula $Mg_{0.75}Al_{0.25}$(OH)$_2$(Cl)$_{0.25}$.0.48 (H$_2$O).0.04(acetone)) was synthesized by adding 50 mL MgCl$_2$.6H$_2$O (0.0375 mol) and AlCl$_3$.6H$_2$O (0.0125 mol) solution drop-wise into a 50 mL NaCl (0.025 mol) solution. The pH of the precipitation solution was controlled at about 10 using a NaOH solution (4 M). The obtained LDHs were filtered and washed with $H_2O$ until pH=7. Half of the "water-wet cake" was dried at 65° C., and the other half was redispersed in acetone solution again. After an adequate stirring for about 1-2 h, the sample was filtered and washed with acetone, followed by a drying step at 65° C.

Synthesis of $Mg_3Al—SO_4$ LDH—

$Mg_3Al—SO_4$ LDH (Chemical Formula: $Mg_{0.75}Al_{0.25}(OH)_2(SO_4)_{0.125} \cdot 0.55(H_2O) \cdot 0.13(acetone)$) was synthesized by adding 50 mL $Mg(NO_3)_2 \cdot 6H_2O$ (0.0375 mol) and $Al_2(SO_4)_3 \cdot 16H_2O$ (0.0125 mol) solution drop-wise into a 50 mL $Na_2SO_4$ (0.025 mol) solution. The pH of the precipitation solution was controlled at about 10 using a NaOH solution (4 M). The obtained LDHs were filtered and washed with $H_2O$ until pH=7. Half of the "water-wet cake" was dried at 65° C., and the other half was redispersed in acetone solution again. After an adequate stirring for about 1-2 h, the sample was filtered and washed with acetone, followed by a drying step at 65° C.

Synthesis of $Zn_3Al—NO_3$ LDH—

$Zn_3Al—NO_3$ LDH (Chemical Formula: $Zn_{0.75}Al_{0.25}(OH)_2(NO_3)_{0.25} \cdot 0.34(H_2O) \cdot 0.1(acetone)$) was synthesized by adding 50 mL $Zn(NO_3)_2 \cdot 6H_2O$ (0.0375 mol) and $Al(NO_3)_3 \cdot 9H_2O$ (0.0125 mol) solution drop-wise into a 50 mL $NaNO_3$ (0.025 mol) solution. The pH of the precipitation solution was controlled at about 10 using a NaOH solution (4 M). The obtained LDHs were filtered and washed with $H_2O$ until pH=7. Half of the "water-wet cake" was dried at 65° C., and the other half was redispersed in acetone solution again. After an adequate stirring for about 1-2 h, the sample was filtered and washed with acetone, followed by a drying step at 65° C.

Synthesis of $Ca_2Al—NO_3$ LDH—

$Ca_2Al—NO_3$ LDH (Chemical Formula: $Ca_{0.67}Al_{0.33}(OH)_2(NO_3)_{0.125} \cdot 0.52(H_2O) \cdot 0.16(acetone)$) was synthesized by adding 50 mL $Ca(NO_3)_2 \cdot 4H_2O$ (0.0375 mol) and $Al(NO_3)_3 \cdot 9H_2O$ (0.0125 mol) solution drop-wise into a 50 mL $NaNO_3$ (0.025 mol) solution. The pH of the precipitation solution was controlled at about 11 using a NaOH solution (4 M). The obtained LDHs were filtered and washed with $H_2O$ until pH=7. Half of the "water-wet cake" was dried at 65° C., and the other half was redispersed in acetone solution again. After an adequate stirring for about 1-2 h, the sample was filtered and washed with acetone, followed by a drying step at 65° C.

Other LDHs with either different cations or different anions were synthesized using the same method. The studied LDHs include $Mg_3Al—NO_3$, $Mg_3Al—Cl$, $Mg_3Al—SO_4$, $Zn_3Al—NO_3$, and $Ca_2Al—NO_3$, etc. With all the studied LDHs, it was observed that acetone treatment highly increases their surface area and leads to the formation of highly dispersed and much smaller LDH particles. For the water washed samples, most of the dried powders are very dense and hard to be crushed into fine powders. For the acetone washed samples, all of them are very "fluffy". These powders are so fine and so highly dispersed that a further grinding is actually not needed. The samples were characterized using XRD, SEM, TEM, TGA, etc, see FIGS. 13-25. SEM images show that all water washed samples are composed of very big and nonporous chunky particles. The particle size is in the range of 20-200 μm. While after acetone treatment, all samples become very porous and are composed of very small and uniform particles. And the particle size becomes around 1-5 μm. TEM images show the similar phenomenon with borate-intercalated LDHs. The water washed LDHs are all plate-like particles which aggregated severally, while the acetone washed LDHs become flower-like particles. This is the reason why acetone washed LDHs have much higher surface area comparing to the water washed samples. The TGA analysis in FIG. 24 shows that the acetone washed $Mg_3Al—NO_3$ LDH has a higher thermal decomposition kinetics than the water washed sample. For instance, both the inter-layer water desorption temperature and the dehydration and inter-layer anion desorption temperature become much lower after being treated with acetone washing. This result is a further evidence that the acetone washed $Mg_3Al—NO_3$ LDH has a much smaller particle size.

For a number of sample LDHs the results for surface area, pore volume and deaggregation factor are given in Table 2 below. In column 1 defining the LDH, the last digits after the anion are the pH of the synthesis solution. For example, in line 1 of Table 2, $Mg_3Al—CO_3$-10 means that the synthesis solution had a pH=10.

5. BET Surface Area ($N_2$) after Calcination and Apparent Density

Also shown are values of BET surface area after calcination for $Mg_3Al$-borate showing a dramatic increase (to 290 m²/g) resulting from the process of the invention in Table 2a. The apparent density of the samples is shown in Table 2b.

TABLE 2

The Surface Properties of AMO-LDHs and C-LDHs

| LDH[1] | Surface Area (m²/g) | | [3]Deaggregation Factor | Pore Volume (cc/g) | | |
| --- | --- | --- | --- | --- | --- | --- |
| | AMO-LDH-A[1] | C-LDH[2] | | AMO-LDH-A[1] | C-LDH[2] | % Change |
| $Mg_3Al—CO_3$-10 | 277 | 43 | 6.4 | 0.63 | 0.11 | 472 |
| $Mg_2Al—CO_3$-10 | 199 | 148 | 1.3 | 1 | 0.9 | 11 |
| $Mg_3Al—CO_3$-12 | 148 | 41 | 3.6 | 0.405 | 0.13 | 222 |
| $Mg_3Al_{0.5}Fe_{0.5}—NO_3$-10 | 128 | 91 | 1.4 | 1.1 | 0.68 | 62 |
| $Zn_2Al$-Borate-8.3 | 301 | 13 | 23 | 2.15 | 0.0816 | 2534 |
| $Mg_3Al$-Borate-9 | 263 | 1 | 263 | 0.516 | 0.00035 | 147329 |
| $Mg_3Al—SO_4$-10 | 101 | 14 | 7.2 | 0.305 | 0.012 | 2442 |

TABLE 2-continued

The Surface Properties of AMO-LDHs and C-LDHs

| Mg$_3$Al—NO$_3$-10 | 169 | 1.5 | 112 | 0.639 | 0.0066 | 9581 |
| Mg$_3$Al—Cl-10 | 64 | 1 | 64 | 0.319 | 0.0031 | 10190 |
| Zn$_3$Al—NO$_3$-8.3 | 61 | 1 | 61 | 0.37 | 0.016 | 2212 |

| LDH | AMO-LDH-M[1] | C-LDH[2] | Deaggregation Factor | AMO-LDH-M[1] | C-LDH[2] | % Change |
|---|---|---|---|---|---|---|
| Mg$_3$Al—CO$_3$-12 | 157 | 43 | 3.65 | 0.94 | 0.11 | 755 |

| LDH[1] | Formula of AMO-LDH-A | Formula of C-LDH |
|---|---|---|
| Mg$_3$Al—CO$_3$-10 | Mg$_{0.75}$Al$_{0.25}$(OH)$_2$(CO$_3$)$_{0.125}$•1.36H$_2$O•0.17(Acetone) | Mg$_{0.75}$Al$_{0.25}$(OH)$_2$(CO$_3$)$_{0.125}$•1.67H$_2$O |
| Mg$_2$Al—CO$_3$-10 | Mg$_{0.67}$Al$_{0.33}$(OH)$_2$(CO$_3$)$_{0.125}$•0.52(H$_2$O)•0.16(acetone) | Mg$_{0.67}$Al$_{0.33}$(OH)$_2$(CO$_3$)$_{0.125}$•0.92(H$_2$O) |
| Mg$_3$Al—CO$_3$-12 | Mg$_{0.75}$Al$_{0.25}$(OH)$_2$(CO$_3$)$_{0.125}$•1.76H$_2$O•0.45(Acetone) | Mg$_{0.75}$Al$_{0.25}$(OH)$_2$(CO$_3$)$_{0.125}$•2.83H$_2$O |
| Mg$_3$Al$_{0.5}$Fe$_{0.5}$—NO$_3$-10 | Mg$_{0.75}$Al$_{0.125}$Fe$_{0.125}$(OH)$_2$(CO$_3$)$_{0.125}$•0.56(H$_2$O)•0.07(acetone) | Mg$_{0.75}$Al$_{0.125}$Fe$_{0.125}$(OH)$_2$(CO$_3$)$_{0.125}$•0.74(H$_2$O) |
| Zn$_2$Al-Borate-8.3 | Zn$_{0.67}$Al$_{0.33}$(OH)$_2$(B$_4$O$_5$(OH)$_4$)$_{0.125}$•0.34(H$_2$O)•0.11(acetone) | Zn$_{0.67}$Al$_{0.33}$(OH)$_2$(B$_4$O$_5$(OH)$_4$)$_{0.125}$•0.65(H$_2$O) |
| Mg$_3$Al-Borate-9 | Mg$_{0.75}$Al$_{0.25}$(OH)$_2$(B$_4$O$_5$(OH)$_4$)$_{0.125}$•0.53(H$_2$O)•0.21(acetone) | Mg$_{0.75}$Al$_{0.25}$(OH)$_2$(B$_4$O$_5$(OH)$_4$)$_{0.125}$•0.59(H$_2$O) |
| Mg$_3$Al—SO$_4$-10 | Mg$_{0.75}$Al$_{0.25}$(OH)$_2$(SO$_4$)$_{0.125}$•0.55(H$_2$O)•0.13(acetone) | Mg$_{0.75}$Al$_{0.25}$(OH)$_2$(SO$_4$)$_{0.125}$•0.6(H$_2$O) |
| Mg$_3$Al—NO$_3$-10 | Mg$_{0.75}$Al$_{0.25}$(OH)$_2$(NO$_3$)$_{0.25}$•0.38(H$_2$O)•0.12(acetone) | Mg$_{0.75}$Al$_{0.25}$(OH)$_2$(NO$_3$)$_{0.25}$•0.57(H$_2$O) |
| Mg$_3$Al—Cl-10 | Mg$_{0.75}$Al$_{0.25}$(OH)$_2$(Cl)$_{0.25}$•0.48(H$_2$O)•0.04(acetone) | Mg$_{0.75}$Al$_{0.25}$(OH)$_2$(Cl)$_{0.25}$•0.61(H$_2$O) |
| Zn$_3$Al—NO$_3$-8.3 | Zn$_{0.75}$Al$_{0.25}$(OH)$_2$(NO$_3$)$_{0.25}$•0.32(H$_2$O)•0.1(acetone) | Zn$_{0.75}$Al$_{0.25}$(OH)$_2$(NO$_3$)$_{0.25}$•0.61(H$_2$O) |

| LDH | Formula of AMO-LDH-M | Formula of C-LDH |
|---|---|---|
| Mg$_3$Al—CO$_3$-12 | Mg$_{0.75}$Al$_{0.25}$(OH)$_2$(CO$_3$)$_{0.125}$•0.44(H$_2$O)•0.11(methanol) | Mg$_{0.75}$Al$_{0.25}$(OH)$_2$(CO$_3$)$_{0.125}$•1.67H$_2$O |

[1]AMO-LDH-A and AMO-LDH-M are an LDH of formula $[M^{z+}_{1-x}M'^{y+}_x(OH)_2]^{a+}(X^{n-})_{a/r}\cdot bH_2O\cdot c(AMO\text{-}solvent)$ (1) wherein M and M' are metal cations, z = 1 or 2; y = 3 or 4, 0 < x < 1, b = 0-10, c = 0-10, X is an anion, r is 1 to 3 and a = z(1 − x) + xy-2. AMO-solvent (A = Acetone, M = Methanol)
[2]C-LDH is an LDH of formula $[M^{z+}_{1-x}M'^{y+}_x(OH)_2]^{a+}(X^{n-})_{a/r}\cdot bH_2O$ (2) wherein M and M' are metal cations, z = 1 or 2; y = 3 or 4, 0 < x < 1, b = 0-10, c = 0-10, X is an anion, r is 1 to 3 and a = z(1 − x) + xy-2.
[3]Deaggregation Factor is defined as the ratio of the BET surface area of acetone washed sample to the water washed sample.

TABLE 2a

| | BET Surface Area (m$^2$/g$^{-1}$) | | | |
|---|---|---|---|---|
| LDH | C-LDH[2] (calcined)$ | AMO-LDH-A[1] (calcined)$ | Formula of AMO-LDH-A (before calcination) | Formula of C-LDH (before calcination) |
| Mg$_3$Al—NO$_3$-10 | | 310 | Mg$_{0.75}$Al$_{0.25}$(OH)$_2$(NO$_3$)$_{0.25}$•0.38(H$_2$O)•0.12(acetone) | Mg$_{0.75}$Al$_{0.25}$(OH)$_2$(NO$_3$)$_{0.25}$•0.57(H$_2$O) |
| Mg$_3$Al-Borate-9 | 5 | 290 | Mg$_{0.75}$Al$_{0.25}$(OH)$_2$(B$_4$O$_5$(OH)$_4$)$_{0.125}$•0.53(H$_2$O)•0.21(acetone) | Mg$_{0.75}$Al$_{0.25}$(OH)$_2$(B$_4$O$_5$(OH)$_4$)$_{0.125}$•0.59(H$_2$O) |
| Zn$_2$Al-Borate-8.3 | | 221 | Zn$_{0.67}$Al$_{0.33}$(OH)$_2$(B$_4$O$_5$(OH)$_4$)$_{0.125}$•0.34(H$_2$O)•0.11(acetone) | Zn$_{0.67}$Al$_{0.33}$(OH)$_2$(B$_4$O$_5$(OH)$_4$)$_{0.125}$•0.65(H$_2$O) |
| Mg$_3$Al—CO$_3$-10 | | 327 | Mg$_{0.75}$Al$_{0.25}$(OH)$_2$(CO$_3$)$_{0.125}$•1.36H$_2$O•0.17(Acetone) | Mg$_{0.75}$Al$_{0.25}$(OH)$_2$(CO$_3$)$_{0.125}$•1.67H$_2$O |

$ Calcined at 400° C. for 5 hrs.

[1]AMO-LDH-A is an LDH of formula $[M^{z+}_{1-x}M'^{y+}_x(OH)_2]^{a+}(X^{n-})_{a/r}\cdot bH_2O\cdot c(AMO\text{-}solvent)$ (1) wherein M and M' are metal cations, z = 1 or 2; y = 3 or 4, 0 < x < 1, b = 0-10, c = 0-10, X is an anion, r is 1 to 3 and a = z(1 − x) + xy-2. AMO-solvent (A = Acetone, M = Methanol)
[2]C-LDH is an LDH of formula $[M^{z+}_{1-x}M'^{y+}_x(OH)_2]^{a+}(X^{n-})_{a/r}\cdot bH_2O$ (2) wherein M and M' are metal cations, z = 1 or 2; y = 3 or 4, 0 < x < 1, b = 0-10, c = 0-10, X is an anion, r is 1 to 3 and a = z(1 − x) + xy-2.

TABLE 2b

| LDH | Apparent density[3] (g/mL) C-LDH[2] | Apparent density[3] (g/mL) AMO-LDH-A[1] | Density Decrease % | Formula of AMO-LDH-A | Formula of C-LDH |
|---|---|---|---|---|---|
| $Mg_3Al$—$NO_3$-10 | 0.91 | 0.12 | 86.8 | $Mg_{0.75}Al_{0.25}(OH)_2(NO_3)_{0.25}$•0.38($H_2O$)•0.12(acetone) | $Mg_{0.75}Al_{0.25}(OH)_2(NO_3)_{0.25}$•0.57($H_2O$) |
| $Mg_3Al$—$SO_4$-10 | 0.99 | 0.13 | 86.8 | $Mg_{0.75}Al_{0.25}(OH)_2(SO_4)_{0.125}$•0.55($H_2O$)•0.13(acetone) | $Mg_{0.75}Al_{0.25}(OH)_2(SO_4)_{0.125}$•0.6($H_2O$) |
| $Mg_3Al$—Cl-10 | 1.03 | 0.24 | 76.7 | $Mg_{0.75}Al_{0.25}(OH)_2(Cl)_{0.25}$•0.48($H_2O$)•0.04(acetone | $Mg_{0.75}Al_{0.25}(OH)_2(Cl)_{0.25}$•0.61($H_2O$) |
| $Zn_3Al$—$NO_3$-8.3 | 1.24 | 0.31 | 75.0 | $Zn_{0.75}Al_{0.25}(OH)_2(NO_3)_{0.25}$•0.32($H_2O$)•0.1(acetone) | $Zn_{0.75}Al_{0.25}(OH)_2(NO_3)_{0.25}$•0.61($H_2O$) |
| $Mg_3Al$-Borate-9 | 1.01 | 0.14 | 86.1 | $Mg_{0.75}Al_{0.25}(OH)_2(B_4O_5(OH)_4)_{0.125}$•0.53($H_2O$)•0.21(acetone) | $Mg_{0.75}Al_{0.25}(OH)_2(B_4O_5(OH)_4)_{0.125}$•0.59($H_2O$) |
| $Zn_2Al$-Borate-8.3 | 0.62 | 0.10 | 83.9 | $Zn_{0.67}Al_{0.33}(OH)_2(B_4O_5(OH)_4)_{0.125}$•0.34($H_2O$)•0.11(acetone) | $Zn_{0.67}Al_{0.33}(OH)_2(B_4O_5(OH)_4)_{0.125}$•0.65($H_2O$) |
| $Mg_3Al$—$CO_3$-10 | 0.9 | 0.10 | 90.0 | $Mg_{0.75}Al_{0.25}(OH)_2Q(CO_3)_{0.125}$•1.36$H_2O$•0.17(Acetone) | $Mg_{0.75}Al_{0.25}(OH)_2(CO_3)_{0.125}$•1.67$H_2O$ |

[1]AMO-LDH-A is an LDH of formula $[M^{z+}_{1-x}M'^{y+}_x(OH_2)]^{a+}(X^{n-})_{a/r}$•$bH_2O$•c(AMO-solvent) (1) wherein M and M' are metal cations, z = 1 or 2; y = 3 or 4, 0 < x < 1, b = 0-10, c = 0-10, X is an anion, r is 1 to 3 and a = z(1 − x) + xy-2. AMO-solvent (A = Acetone, M = Methanol)
[2]C-LDH is an LDH of formula $[M^{z+}_{1-x}M'^{y+}_x(OH_2)]^{a+}(X^{n-})_{a/r}$•$bH_2O$ (2) wherein M and M' are metal cations, z = 1 or 2; y = 3 or 4, 0 < x < 1, b = 0-10, c = 0-10, X is an anion, r is 1 to 3 and a = z(1 − x) + xy-2.
[3]Apparent Density is the weight per unit volume of a LDH powder (after tapping manually for 2 min), this may be different to the weight per unit volume of individual LDH particles.

Method:

Apparent density may be determined by the following procedure. The LDH as a free-flowing powder was filled into a 2 mL disposable pipette tip, and the solid was packed as tight as possible by tapping manually for 2 min. The weight of the pipette tip was measured before and after the packing to determine the mass of the LDH. Then the apparent density of LDH was calculated using the following equation:

Apparent density=LDH weight (g)/LDH volume (2 mL)

Further, the water and AMO-solvent content in the LDHs of the present invention compared to conventional C-LDHs was determined by the TGA data. The results are summarized in Table 3.

TABLE 3

Summary of water and AMO-solvent content in the AMO-LDHs compared to conventional C-LDHs as determined by analysis of the TGA data (FIGS. 14, 15, and 16).

| LDH | C-LDH[2] b[3] | C-LDH[2] c[4] | AMO-LDH-A[1] b[3] | AMO-LDH-A[1] c[4] | AMO-LDH-M[1] b[3] | AMO-LDH-M[1] c[4] |
|---|---|---|---|---|---|---|
| $Mg_3Al$—$CO_3$-10 | 0.42 | 0 | 0.34 | 0.04 | — | — |
| $Mg_3Al$—$CO_3$-12 | 0.71 | 0 | 0.44 | 0.11 | 0.44 | 0.11 |
| $Mg_2Al$—$CO_3$-10 | 0.92 | 0 | 0.52 | 0.16 | — | — |
| $Mg_3Al$—Cl-10 | 0.61 | 0 | 0.48 | 0.04 | — | — |
| $Mg_3Al$—$SO_4$-10 | 0.60 | 0 | 0.55 | 0.13 | — | — |
| $Mg_3Al$—$NO_3$-10 | 0.57 | 0 | 0.38 | 0.12 | — | — |
| $Mg_3Al$-Borate-10 | 0.59 | 0 | 0.53 | 0.21 | — | — |
| $Mg_3Al_{0.5}Fe_{0.5}$-10 | 0.74 | 0 | 0.56 | 0.07 | — | — |
| $Zn_3Al$-Borate-8.3 | 0.65 | 0 | 0.34 | 0.11 | — | — |
| $Zn_2Al$—$NO_3$-8.3 | 0.61 | 0 | 0.32 | 0.10 | — | — |

[1]AMO-LDH-A and AMO-LDH-M are the LDH with the formula of $[M^{z+}_{1-x}M'^{y+}_x(OH_2)]^{a+}(X^{n-})_{a/r}$•$bH_2O$•c(AMO-solvent) (1) wherein M and M' are metal cations, z = 1 or 2; y = 3 or 4, 0 < x < 1, b = 0-10, c = 0-10, X is an anion, r is 1 to 3 and a = z(1 − x) + xy-2. AMO-solvent (A = Acetone, M = Methanol).
[2]C-LDH is an LDH of formula $[M^{z+}_{1-x}M'^{y+}_x(OH_2)]^{a+}(X^{n-})_{a/r}$•$bH_2O$ (2) wherein M and M' are metal cations, z = 1 or 2; y = 3 or 4, 0 < x < 1, b = 0-10, c = 0-10, X is an anion, r is 1 to 3 and a = z(1 − x) + xy-2.
[3]b is the water content in the formula (1) and (2).
[4]c is the acetone content in the formula (1).

6. Other Possible Washing Solvents

In addition to acetone, several other washing solvents were also investigated. FIG. 25 shows the XRD patterns of $Zn_2Al$-borate LDHs washed with acetone, ethanol, and methanol, respectively. The Bragg diffraction peaks disappeared for all samples, indicating that all these washing solvents are effective for the treatment. Because the key function of the washing solvents is to wash off the surface adsorbed water molecules and prevent the further combination of LDH nanoparticles during the drying step, it is believed that all the solvents which have a 100% miscibility with $H_2O$ and appropriate polarity, as listed in Table 4, should be effective as washing solvent.

TABLE 4

Solvents that have a 100% miscibility with $H_2O$ and can be used as washing solvents.

| Solvents | Boiling point (° C.) | Viscosity (cPoise) | P'* | Solubility in water (% w/w) |
|---|---|---|---|---|
| Acetone | 56 | 0.32 | 5.1 | 100 |
| Acetonitrile | 82 | 0.37 | 5.8 | 100 |
| Dimethylformamide | 155 | 0.92 | 6.4 | 100 |
| Dimethyl Sulfoxide | 189 | 2 | 7.2 | 100 |
| Dioxane | 101 | 1.54 | 4.8 | 100 |
| Ethanol | 78 | 1.2 | 4.3 | 100 |
| Methanol | 65 | 0.6 | 5.1 | 100 |
| n-propanol | 97 | 2.27 | 4.0 | 100 |
| Iso-propanol | 82 | 2.3 | 3.9 | 100 |
| Tetrahydrofuran | 65 | 0.55 | 4.0 | 100 |

*Polarity (P') as defined in Snyder and Kirkland (Snyder, L. R.; Kirkland, J. J. In Introduction to modern liquid chromatography, 2nd ed.; John Wiley and Sons: New York, 1979; pp 248-250)

7. Further Investigations

Characteristic density properties of an LDH prepared according to the invention (AMO-LDH) compared to a conventionally prepared LDH (C-LDH) were measured. Results can be taken from Table 5.

TABLE 5

Density Properties of AMO-LDHs, C-LDHs and Commercial LDHs.

| | Loose Bulk Density (g/mL) | | | Tap Density (g/mL) | | | Carr's Index |
|---|---|---|---|---|---|---|---|
| LDH | AMO-LDH-A[1] | C-LDH[2] | % Change | AMO-LDH-A[1] | C-LDH[2] | % Change | AMO-LDH-A[1] |
| $Mg_3Al$—$SO_4$-10 | 0.1 | 0.41 | 76 | 0.16 | 0.63 | 75 | 40 |
| $Mg_3Al$—$NO_3$-10 | 0.15 | 0.95 | 84 | 0.22 | 1.2 | 82 | 32 |
| $Mg_3Al$—Cl-10 | 0.18 | 0.29 | 38 | 0.26 | 0.44 | 41 | 35 |
| | AMO-LDH-A[1] | MG[3] 62 | % Change | AMO-LDH-A[1] | MG[3] 62 | % Change | AMO-LDH-A[1] |
| $Mg_3Al$—$CO_3$-10 | 0.14 | 0.46 | 70 | 0.2 | 0.64 | 68 | 35 |

| | Carr's Index | | | |
|---|---|---|---|---|
| LDH | C-LDH[2] | % Change | Formula of AMO-LDH-A | Formula of C-LDH |
| $Mg_3Al$—$SO_4$-10 | 35 | 14 | $Mg_{0.75}Al_{0.25}(OH)_2(SO_4)_{0.125}$•0.55($H_2O$)•0.13(acetone) | $Mg_{0.75}Al_{0.25}(OH)_2(SO_4)_{0.125}$•0.6($H_2O$) |
| $Mg_3Al$—$NO_3$-10 | 22 | 45 | $Mg_{0.75}Al_{0.25}(OH)_2(NO_3)_{0.25}$•0.38($H_2O$)•0.12(acetone) | $Mg_{0.75}Al_{0.25}(OH)_2(NO_3)_{0.25}$•0.57($H_2O$) |
| $Mg_3Al$—Cl-10 | 35 | 0 | $Mg_{0.75}Al_{0.25}(OH)_2(Cl)_{0.25}$•0.48($H_2O$)•0.04(acetone) | $Mg_{0.75}Al_{0.25}(OH)_2(Cl)_{0.25}$•0.61($H_2O$) |
| | MG[3] 62 | % Change | Formula of AMO-LDH-A | Formula of MG 62 |
| $Mg_3Al$—$CO_3$-10 | 29 | 20 | $Mg_{0.75}Al_{0.25}(OH)_2(CO_3)_{0.125}$•1.36$H_2O$•0.17(Acetone) | NA |

[1]AMO-LDH-A is the LDHs with the formula of $[M^{z+}_{1-x}M'^{y+}_x(OH)_2]^{a+}(X^{n-})_{a/r}$•$bH_2O$•c(AMO-solvent) (1) wherein M and M' are metal cations, z = 1 or 2; y = 3 or 4, 0 < x < 1, b = 0-10, c = 0-10, X is an anion, r is 1 to 3, a = z(1 − x) + xy-2, AMO-solvent (A = Acetone, M = Methanol)
[2]C-LDH is the LDHs with the formula of $[M^{z+}_{1-x}M'^{y+}_x(OH)_2]^{a+}(X^{n-})_{a/r}$•$bH_2O$ (2) wherein M and M' are metal cations, z = 1 or 2; y = 3 or 4, 0 < x < 1, b = 0-10, c = 0-10, X is an anion, r is 1 to 3 and a = z(1 − x) + xy-2.
[3]MG 62 is the commercial hydrotalcite, PURAL MG 62 HT, from Sasol Ltd.

Further, thermal properties of inventive LDHs and conventional C-LDHs were measured. The results are summarized in Table 6.

TABLE 6

Thermal properties of AMO-LDHs and C-LDHs.

| | T1 (° C.) | | | T2 (° C.) | | | | |
|---|---|---|---|---|---|---|---|---|
| LDH | AMO-LDH-A[1] | C-LDH[2] | % Change | AMO-LDH-A[1] | C-LDH[2] | % Change | Formula of AMO-LDH-A | Formula of C-LDH |
| $Mg_3Al$—$CO_3$-12 | 187 | 205 | −18 | 382 | 399 | −17 | $Mg_{0.75}Al_{0.25}(OH)_2(CO_3)_{0.125}$•1.76$H_2O$•0.45(Acetone) | $Mg_{0.75}Al_{0.25}(OH)_2(CO_3)_{0.125}$•2.83$H_2O$ |
| $Mg_3Al$—$CO_3$-10 | 150 | 169 | −19 | 340 | 424 | −84 | $Mg_{0.75}Al_{0.25}(OH)_2(CO_3)_{0.125}$•1.36$H_2O$•0.17(Acetone) | $Mg_{0.75}Al_{0.25}(OH)_2(CO_3)_{0.125}$•1.67$H_2O$ |
| $Mg_2Al$—$CO_3$-10 | 181 | 187 | −6 | 347 | 392 | −45 | $Mg_{0.67}Al_{0.33}(OH)_2(CO_3)_{0.125}$•0.52($H_2O$)•0.16(acetone) | $Mg_{0.67}Al_{0.33}(OH)_2(CO_3)_{0.125}$•0.92($H_2O$) |
| LDH | AMO-LDH-M[1] | C-LDH[2] | % Change | AMO-LDH-M[1] | C-LDH[2] | % Change | Formula of AMO-LDH-A | Formula of C-LDH |
| $Mg_3Al$—$CO_3$-12 | 191 | 205 | −14 | 392 | 399 | −7 | $Mg_{0.75}Al_{0.25}(OH)_2(CO_3)_{0.125}$•0.44($H_2O$)•0.11(methanol) | $Mg_{0.75}Al_{0.25}(OH)_2(CO_3)_{0.125}$•1.67$H_2O$ |

T1 and T2 are defined as the turning points in 1st derivative of the weight loss as a function of temperature {d (% Wt loss)/d(° C.)} as measured by the TGA. (i.e. when 2nd derivative of the TGA is zero). These points indicate significant changes in heat flow and so mark out key changes to a material on heating.
[1]AMO-LDH-A and AMO-LDH-M are the LDH with the formula of $[M^{z+}_{1-x}M'^{y+}_x(OH)_2]^{a+}(X^{n-})_{a/r}$•$bH_2O$•c(AMO-solvent) (1) wherein M and M' are metal cations, z = 1 or 2; y = 3 or 4, 0 < x < 1, b = 0-10, c = 0-10, X is an anion, r is 1 to 3 and a = z(1 − x) + xy-2. AMO-solvent (A = Acetone, M = Methanol)
[2]C-LDH is the LDH with the formula of $[M^{z+}_{1-x}M'^{y+}_x(OH)_2]^{a+}(X^{n-})_{a/r}$•$bH_2O$ (2) wherein M and M' are metal cations, z = 1 or 2; y = 3 or 4, 0 < x < 1, b = 0-10, c = 0-10, X is an anion, r is 1 to 3 and a = z(1 − x) + xy-2.

The features disclosed in the foregoing description, in the claims and in the accompanying drawings may both separately or in any combination be material for realizing the invention in diverse forms thereof.

The invention claimed is:

1. A process for modifying a layered double hydroxide (LDH), the process comprising:
   a. providing a layered double hydroxide that is water-wet and of formula:

$$[M^{z+}{}_{1-x}M'^{y+}{}_x(OH)_2]^{a+}(X^{n-})_{a/r} \cdot bH_2O \quad (a)$$

wherein M and M' are metal cations, z=1 or 2; y=3 or 4, x is 0.1 to 1, b is 0 to 10, X is an anion, r is 1 to 3, n is the charge on the anion X and a=z(1−x)+xy−2;
   b. maintaining the layered double hydroxide water-wet,
   c. dispersing the layered double hydroxide that is water-wet in at least one solvent, the solvent being miscible with water; and
   d. filtering and washing the layered double hydroxide that has been dispersed, with the at least one solvent.

2. The process as claimed in claim 1, wherein M is Mg, Zn, Fe, Ca or a mixture of two or more thereof.

3. The process as claimed in claim 1, wherein M' is Al, Ga, Fe or a mixture of Al and Fe.

4. The process as claimed in claim 1, wherein z is 2 and M is Ca, Mg, or Zn.

5. The process as claimed in claim 1, wherein M' is Al.

6. The process as claimed in claim 1, wherein M is Zn, Mg or Ca, and M' is Al.

7. The process as claimed in claim 1, wherein X is selected from a halide, inorganic oxyanions, anionic surfactants, anionic chromophores, anionic UV absorbers, or a combination of anionic UV absorbers and any of the foregoing.

8. The process as claimed in claim 7, wherein the inorganic oxyanions include carbonate, bicarbonate, hydrogenphosphate, dihydrogenphosphate, nitrite, borate, nitrate, sulphate or phosphate or a mixture of two or more thereof.

9. The process as claimed in claim 1 the at least one solvent is an organic solvent selected from acetone, acetonitrile, dimethylformamide, dimethyl sulfoxide, dioxane, ethanol, methanol, n-propanol, 2-propanol, tetrahydrofuran or a mixture of two or more thereof.

10. The process as claimed in claim 1, further comprising drying the layered double hydroxide after filtering and washing the layered double hydroxide that has been dispersed, with the at least one solvent.

11. The process as claimed in claim 1, further comprising subjecting the layered double hydroxide to a thermal treatment after filtering and washing the layered double hydroxide that has been dispersed, with the at least one solvent.

12. The process as claimed in claim 1 wherein x=0.1–0.9.

13. The process as claimed in claim 1 wherein the at least one solvent has a solvent polarity (P') in the range 3.8 to 9.

14. The process as claimed in claim 11 wherein the thermal treatment is a heat treatment performed in a temperature range from about 50 to about 600° C.

15. The process as claimed in claim 1, wherein dispersing the layered double hydroxide that is water-wet in at least one solvent includes dispersing the layered double hydroxide in the at least one solvent for a time sufficient to cause the layered double hydroxide to exhibit a 34% to 11,000% increase in surface area.

16. The process as claimed in claim 1, wherein dispersing the layered double hydroxide that is water-wet in at least one solvent includes dispersing the layered double hydroxide in the at least one solvent for 1 hour to 2 hours.

* * * * *